(12) United States Patent
Brewer et al.

(10) Patent No.: US 11,489,154 B2
(45) Date of Patent: Nov. 1, 2022

(54) MULTILAYER ANODES FOR LITHIUM-BASED ENERGY STORAGE DEVICES

(71) Applicant: Graphenix Development, Inc., Williamsville, NY (US)

(72) Inventors: John C. Brewer, Rochester, NY (US); Paul D. Garman, Pittsford, NY (US); Bernard Philip Gridley, Rochester, NY (US); Robert G. Anstey, Tonawanda, NY (US); Kevin Tanzil, Rochester, NY (US)

(73) Assignee: Graphenix Development, Inc., Williamsville, NY (US)

( * ) Notice: Subject to any disclaimer, the term of this patent is extended or adjusted under 35 U.S.C. 154(b) by 262 days.

(21) Appl. No.: 16/997,110

(22) Filed: Aug. 19, 2020

(65) Prior Publication Data

US 2021/0057733 A1     Feb. 25, 2021

Related U.S. Application Data

(60) Provisional application No. 62/889,119, filed on Aug. 20, 2019.

(51) Int. Cl.
*H01M 4/36* (2006.01)
*H01M 10/0525* (2010.01)
(Continued)

(52) U.S. Cl.
CPC .............. *H01M 4/366* (2013.01); *H01M 4/13* (2013.01); *H01M 4/38* (2013.01); *H01M 4/62* (2013.01);
(Continued)

(58) Field of Classification Search
CPC ........ H01M 4/70; H01M 4/134; H01M 4/625; H01M 4/626; H01M 10/0525;
(Continued)

(56) References Cited

U.S. PATENT DOCUMENTS

| 5,567,474 A | 10/1996 | Dover et al. |
| 5,776,369 A | 7/1998 | Dover et al. |

(Continued)

FOREIGN PATENT DOCUMENTS

| WO | WO2013012334 A1 | 1/2013 |
| WO | WO2015175509 A1 | 11/2015 |

(Continued)

OTHER PUBLICATIONS

International Application No. PCT/US2021/026179 received an International Search Report and Written Opinion dated Jul. 9, 2021, 9 pages.

(Continued)

*Primary Examiner* — Stewart A Fraser
(74) *Attorney, Agent, or Firm* — Kilpatrick Townsend & Stockton LLP

(57) ABSTRACT

An anode for an energy storage device such as a lithium-ion energy storage device is disclosed. The anode includes a current collector having a metal oxide layer, a first lithium storage layer overlaying the current collector, a first intermediate layer overlaying at least a portion of the first lithium storage layer, and a second lithium storage layer overlaying the first intermediate layer. The first lithium storage layer is a continuous porous lithium storage layer having a total content of silicon, germanium, or a combination thereof, of at least 40 atomic %.

19 Claims, 6 Drawing Sheets

(51) Int. Cl.
  *H01M 4/66* (2006.01)
  *H01M 4/13* (2010.01)
  *H01M 4/62* (2006.01)
  *H01M 4/38* (2006.01)
  *H01M 4/02* (2006.01)
(52) U.S. Cl.
  CPC ........ *H01M 4/664* (2013.01); *H01M 10/0525* (2013.01); *H01M 2004/021* (2013.01)
(58) Field of Classification Search
  CPC ..... H01M 2004/021; H01M 2004/027; H01M 4/386; H01M 4/66; H01M 4/663
  See application file for complete search history.

(56) References Cited

U.S. PATENT DOCUMENTS

| | | | |
|---|---|---|---|
| 5,976,403 | A | 11/1999 | Dover et al. |
| 6,761,744 | B1 | 7/2004 | Tsukamoto et al. |
| 6,911,280 | B1 | 6/2005 | De Jonghe et al. |
| 7,378,041 | B2 | 5/2008 | Asao et al. |
| 7,767,341 | B2 | 8/2010 | Kogetsu et al. |
| 8,257,866 | B2 | 9/2012 | Loveness et al. |
| 8,377,236 | B2 | 2/2013 | Yakovleva et al. |
| 8,906,523 | B2 | 12/2014 | Brantner et al. |
| 9,281,515 | B2 | 3/2016 | Nazri et al. |
| 9,293,771 | B2 | 3/2016 | Tani et al. |
| 9,376,455 | B2 | 6/2016 | Lee et al. |
| 10,014,552 | B1 | 7/2018 | Shnitser et al. |
| 10,115,960 | B2 | 10/2018 | Lee et al. |
| 10,164,252 | B2 | 12/2018 | Yang et al. |
| 10,686,214 | B2 | 6/2020 | Liu et al. |
| 10,910,653 | B2 | 2/2021 | Brew er et al. |
| 11,024,842 | B2 | 6/2021 | O'toole et al. |
| 2004/0191630 | A1* | 9/2004 | Kawamura ............. H01M 4/38 429/231.95 |
| 2005/0031958 | A1 | 2/2005 | Fukuoka et al. |
| 2006/0216604 | A1 | 9/2006 | Kawase et al. |
| 2007/0207381 | A1 | 9/2007 | Ohtsuka et al. |
| 2009/0162750 | A1* | 6/2009 | Kawakami ............. H01M 4/58 252/182.1 |
| 2010/0216026 | A1 | 8/2010 | Lopatin et al. |
| 2010/0285358 | A1 | 11/2010 | Cui et al. |
| 2010/0330421 | A1 | 12/2010 | Cui et al. |
| 2011/0111304 | A1 | 5/2011 | Cui et al. |
| 2011/0159365 | A1 | 6/2011 | Loveness et al. |
| 2011/0266654 | A1 | 11/2011 | Kuriki et al. |
| 2012/0121983 | A1 | 5/2012 | Yoon et al. |
| 2013/0143124 | A1 | 6/2013 | Lee et al. |
| 2014/0011088 | A1 | 1/2014 | Lopatin et al. |
| 2014/0248543 | A1 | 9/2014 | Zhu et al. |
| 2015/0072119 | A1 | 3/2015 | George et al. |
| 2015/0118572 | A1 | 4/2015 | Lund et al. |
| 2015/0325852 | A1 | 11/2015 | Wang et al. |
| 2016/0190564 | A1 | 6/2016 | Samarao et al. |
| 2017/0133662 | A1 | 5/2017 | Cui et al. |
| 2017/0279163 | A1 | 9/2017 | Jang et al. |
| 2017/0301616 | A1 | 10/2017 | Biederman et al. |
| 2017/0335482 | A1 | 11/2017 | Date et al. |
| 2018/0083264 | A1 | 3/2018 | Soppe |
| 2018/0123132 | A1 | 5/2018 | Kawakami et al. |
| 2018/0145367 | A1 | 5/2018 | Busacca et al. |
| 2018/0166735 | A1 | 6/2018 | Busacca et al. |
| 2018/0287130 | A1 | 10/2018 | de Souza et al. |
| 2019/0044151 | A1 | 2/2019 | Elam et al. |
| 2019/0097275 | A1 | 3/2019 | Mitlin et al. |
| 2019/0267361 | A1 | 8/2019 | Brewer et al. |
| 2021/0050584 | A1 | 2/2021 | Brew er et al. |
| 2021/0057757 | A1 | 2/2021 | Brewer et al. |

FOREIGN PATENT DOCUMENTS

| | | |
|---|---|---|
| WO | WO2016112333 A1 | 7/2016 |
| WO | 2019165412 A1 | 8/2019 |
| WO | 2021029769 A | 2/2021 |

OTHER PUBLICATIONS

Amine, et al.,"Novel Chemistry: Lithium Selenium and Selenium Sulfur Couple", Argonne Natl Lab, DOE Merit Yeview, Jun. 6-10, 2016 Project ES280 https://www.energy.gov/sites/prod/files/2016/06/f32/es280_amine_2016_p_web.pdf, 22 pages.

Beattie, "Understanding capacity fade in silicon based electrodes for lithium-ion batteries using three electrode cells And upper cut-off voltage studies", Science Direct, Journal of Power Sources, 2016, vol. 302, 426-430, Elsevier.

Cho, "Enhanced Lithium Ion battery Cycling of Silicon Nanowire Anodes by Template Growth to Eliminate Silicon Underlayer Islands", NANO Letters, 2013. vol. 13, 5740-5747.

Christopherson; Jon P. "Battery Test Manual For Electric Vehicles", , Idaho National Lab, Jun. 2015, 67 pages.

Corte, "Effets du traitement chimique de la surface d'une", Ecole Polytechnique ParisTech, Oct. 2013, 1-139.

Domi, et al., "Effect of Mechanical Pre-Lithiation on Electrochemical Performance of Silicon Negative Electrode for Lithium-Ion Batteries", J. Electrochem. Soc. 164(7) pp. A1651-A1654, Jun. 2017.

Fotouhi, et al., "Lithium-Sulfur Battery Technology Readiness and Applications—A Review", Energies Nov. 2017, 15 pages.

Gomez-Baquero, "Silicon Anodes to Enable Better Lithium Ion Batteries", ResearchGate, Apr. 1-28, 2016, Besstect LLC.

Holstiege, et al., "Pre-Lithiation Strategies for Rechargeable Energy Storage Technologies: Concepts, Promises and Challenges", Batteries, Jan. 2018, 39 pages.

Kim, "Electrochemical characteristics of Si/Mo multilayer anode for Li ion batteries", Revista Mexicana De Fisica S53, 2007, 17-20.

Li, "One-step synthesis of Li-doped NiO as high-performance anode material for lithium ion batteries", Ceramics International, 2016, vol. 42, 14565-14572, Elsevier.

Lin, "Optical Characterization of Hydrogenated Amorphous Silicon Thin Films Deposited at High Rate", Journal of Electronic Materials, 1999, vol. 28, No. 12, 1452-1456.

Lin, et al., "Lithium Superionic Sulfide Cathode for All-Solid Lithium-Sulfur Batteries", ACS Nano, vol. 7, No. 3, 2829-2833 Feb. 2013.

Lin, et al., "Reviving the lithium metal anode for high-energy batteries", Nature Nanotechnology, vol. 12, 194-206, Mar. 2017.

Nominand, et al., "Process and Material Properties of PECVD Boron-Doped Amorphous Silicon Film", https://www.electrochem.org/dl/ma/201/pdfs/0399.pdf (pub date unknown), 1 page.

Notten, "Advanced Energy Storage Materials for Battery Applications, Advanced Materials", Dec. 12, 2012, 1-50, NL Agency Ministry of Economic Affairs, Agriculture and Innovation.

Quiroga-González, "Optimal Conditions for Fast Charging and Long Cycling Stability of Silicon Microwire Anodes for Lithium on Batteries, and Comparison with the Performance of Other Si Anode Concepts", Energies, 2013, vol. 6, 5145-5156.

Sakabe, et al., "Effect of Mechanical Pre-Lithiation on Electrochemical Performance of Silicon Negative Electrode for Lithium-Ion Batteries", J. Electrochem. Soc. 164(7) A1651-A1654 (2017).

Salah, Pure silicon thin-film anodes for lithium-ion batters: A review, Journal of Power Sources, 2019, vol. 414, 48-67, Elsevier.

Soppe, Self-Organized Nano-Structures Silicon as Anode Material for Li-Ion Batteries, Meeting of Materials Research Society, Apr. 2-6, 2018, 1 page, Phoenix, Arizona.

Stefan; Ionel, "A Commercially Scalable Process for Silicon Anode Prelithiation", Amprius Inc, DOE Merit Review, Jun. 6-10, 2016, Project ES250 https://www.energy.gov/sites/prod/files/2016/06/f32/es250_stefan_2016_o_web.pdf, 23 pages.

Sun, "Nanomembranes Based on Nickel Oxide and Germanium as Anode Materials for Lithium-Ion Batteries", Dissertation, May 10, 2017, China.

Uehara, "Thick vacuum deposited silicon films suitable for the anode of Li-ion battery", Journal of Power Sources, 2005 vol. 146, 441-444, Science Direct.

Ulvestad, et al., "Silicon Nitride Coated Silicon Thin Films as Anodes for Li-Ion Batteries:", ECS Transactions, 64 (22) 107-111, Apr. 2015.

(56) References Cited

OTHER PUBLICATIONS

Ulvestad, et al., "Silicon nitride as anode material for Li-ion batteries: Understanding the SiNx conversion Yeaction", J. Power Sources 399, Aug. 2018 414-421.

Valladares, et al., Characterization of Ni thin films following thermal oxidation in air, Journal of Science Technology, B, vol. 32, Sep./Oct. 2014.

Wu, et al., "Silicon nitride coated silicon thin film on three dimensions current collector for lithium ion battery anode", J. Power Sources 325, Jun. 2016, pp. 64-70.

Yang; Jinho, "Development Of Silicon-Based Anodes And In-Situ Characterization Techniques For Lithium Ion Batteries", Jinho Yang Dissertation, Wayne State Univ , Jan. 2014, 125 pages.

Xu et al., "A high-performance Li-ion anode from direct deposition of Si nanoparticles", Nano Energy 38 (2017) 477-485.

Xu et al., "A high-performance Li-ion anode from direct deposition of Si nanoparticles", no publication date available.

Xu et al., "Engineering the Direct Deposition of Si Nanoparticles for Improved Performance in Li-Ion Batteries", Journal of the Electrochemical Society, 166 (3) A5252-A5258 (2019).

Zhao, et al., "A general prelithiation approach for group IV elements and corresponding oxides", Energy Storage Materials Jun. 2017, 7 pages.

\* cited by examiner

US 11,489,154 B2

MULTILAYER ANODES FOR LITHIUM-BASED ENERGY STORAGE DEVICES

CROSS REFERENCE TO RELATED APPLICATION

This application claims the benefit of priority of U.S. Provisional Application No. 62/889,119, filed Aug. 20, 2019, which is incorporated herein by reference in its entirety for all purposes.

TECHNICAL FIELD

The present disclosure relates to lithium ion batteries and related energy storage devices.

BACKGROUND

Silicon has been proposed as a potential material for lithium-ion batteries to replace the conventional carbon-based anodes which have a storage capacity that is limited to ~370 mAh/g. Silicon readily alloys with lithium and has a much higher theoretical storage capacity (~3600 to 4200 mAh/g at room temperature) than carbon-based anodes. However, insertion and extraction of lithium into the silicon matrix causes significant volume expansion (>300%) and contraction. This can result in rapid pulverization of the silicon into small particles and electrical disconnection from the current collector.

The industry has recently turned its attention to nano- or micro-structured silicon to reduce the pulverization problem, i.e., silicon in the form of spaced apart nano- or micro-wires, tubes, pillars, particles and the like. The theory is that making the structures nano-sized avoids crack propagation and spacing them apart allows more room for volume expansion, thereby enabling the silicon to absorb lithium with reduced stresses and improved stability compared to, for example, macroscopic layers of bulk silicon.

Despite research into structured silicon approaches, such batteries based solely on silicon have yet to make a large market impact due to unresolved problems. A significant issue is the manufacturing complexity and investment required to form these anodes. For example, US20150325852 describes silicon made by first growing a silicon-based, non-conformal, porous layer on a nanowire template by plasma-enhanced chemical vapor deposition (PECVD) followed by deposition of a denser, conformal silicon layer using thermal chemical vapor deposition (CVD). Formation of silicon nanowires can be very sensitive to small perturbations in deposition conditions making quality control and reproducibility a challenge. Other methods for forming nano- or micro-structured silicon use etching of silicon wafers, which is time-consuming and wasteful. Further, the connection between silicon wires to a current collector is inherently fragile and the structures are prone to break or abrade away when subjected to handling stresses needed to manufacture a battery.

SUMMARY

There remains a need for anodes for lithium-based energy storage devices such as lithium-ion batteries that are easy to manufacture, robust to handling, high in charge capacity, and amenable to fast charging.

In accordance with an embodiment of this disclosure, an anode for an energy storage device is provided that includes a current collector having a metal oxide layer, a first lithium storage layer overlaying the current collector, a first intermediate layer overlaying at least a portion of the first lithium storage layer, and a second lithium storage layer overlaying the first intermediate layer. The first lithium storage layer is a continuous porous lithium storage layer that has a total content of silicon, germanium, or a combination thereof, of at least 40 atomic %.

The present disclosure provides anodes for energy storage devices that may have one or more of at least the following advantages relative to conventional anodes: improved stability at aggressive ≥1C charging rates; higher overall areal charge capacity; higher charge capacity per gram of silicon; improved physical durability; simplified manufacturing process; and more reproducible manufacturing process.

DETAILED DESCRIPTION

It is to be understood that the drawings are for purposes of illustrating the concepts of the disclosure and may not be to scale. Various aspects of anodes of the present disclosure, including metal oxide layers, deposition of lithium storage material, additional layers and methods are described in co-pending U.S. patent application Ser. Nos. 16/285,842, 16/909,008, and 16/991,613, the entire contents of which are incorporated by reference for all purposes.

Anode Overview

Figure 1A:
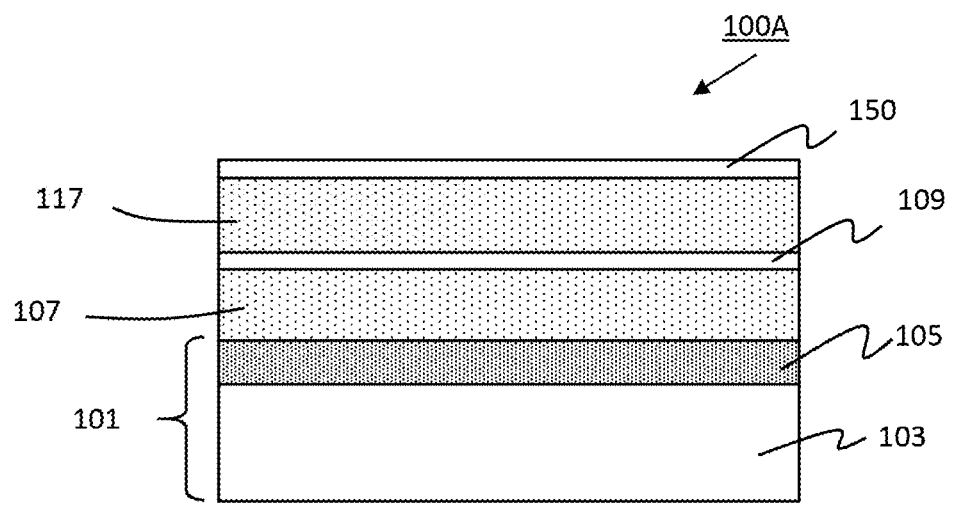
FIG. 1A is a cross-sectional view of an anode according to some embodiments of the present disclosure.

FIG. 1A is a cross-sectional view according to some embodiments of the present disclosure. Anode 100A includes an electrically conductive current collector 101, a first lithium storage layer 107, a first intermediate layer 109 overlaying the first lithium storage layer, a second lithium storage layer 117 overlaying the first intermediate layer, and optionally, a supplemental layer 150 overlaying the topmost lithium storage layer. In some embodiments, the electrically conductive current collector 101 includes a metal oxide layer 105 provided over an electrically conductive layer 103, for example an electrically conductive metal layer. The first lithium storage layer 107 may be provided over metal oxide layer 105. In some embodiments the first lithium storage layer 107 may be in physical contact with the metal oxide layer 105. In some embodiments, the active material of the first lithium storage layer 107 may extend partially into the metal oxide layer 105.

Figure 1B:
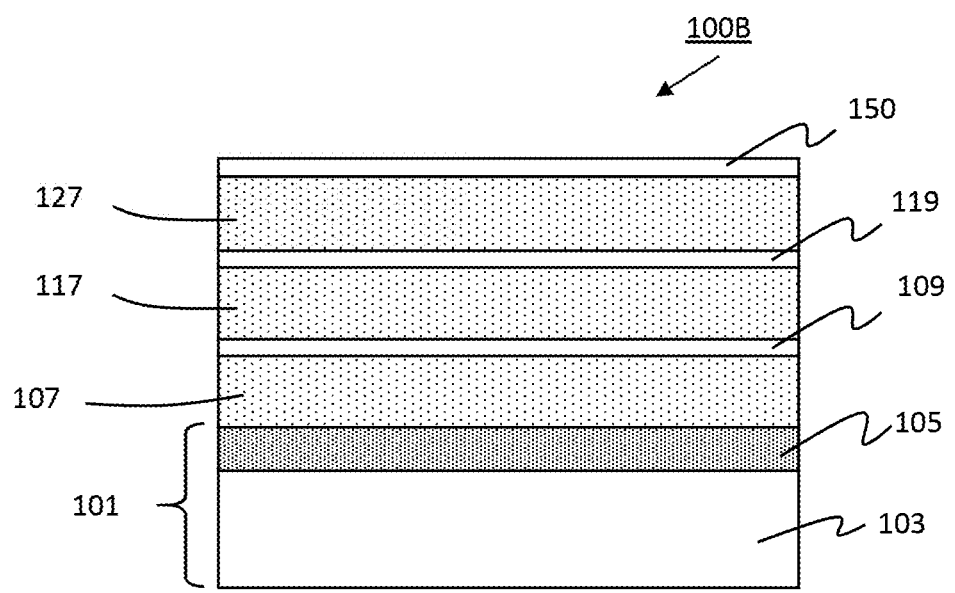
FIG. 1B is a cross-sectional view of an anode according to some embodiments of the present disclosure.

In some embodiments there may be three or more lithium storage layers and two or more intermediate layers. For example, as shown in FIG. 1B, anode 100B may include second intermediate layer 119 overlaying the second lithium storage layer 117, a third lithium storage layer 127 overlaying the second intermediate layer 119 and the optional supplemental layer 150 overlaying the third lithium storage layer 127. In some embodiments, an intermediate layer may be in physical contact with: i) an underlying lithium storage layer; ii) an overlying lithium storage layer, or iii) both the underlying lithium storage layer and the overlying lithium storage layer. In some embodiments the optional supplemental layer is in physical contact with the topmost lithium storage layer, i.e., the lithium storage layer farthest from the current collector.

In some embodiments, two or more lithium storage layers may have substantially the same chemical composition or they may be different. In some embodiments, two or more lithium storage layers may have substantially the same thickness or they may be different. In some embodiment, two or more lithium storage layer may different lithium storage capacities, for example, as measured in units of mAh/cm$^2$ or mAh/g. In some embodiments, the topmost lithium storage layer, may have the highest lithium storage capacity with such capacity decreasing progressively in the lower lithium storage layer(s). In some embodiments, the topmost lithium storage layer may have the lowest lithium storage capacity, with such capacity increasing progressively in the lower layer(s). Other combinations are also possible. For example, with respect to FIG. 1B, the lithium storage capacity of the various lithium storage layers may include the following trends:

107>117>127
107>127>117
117>127>107
117>107>127
127>117>107
127>107>117.

In some embodiments, one or more or all of the lithium storage layers include a material capable of forming an electrochemically reversible alloy with lithium. In some embodiments, one or more or all of the lithium storage layers may each be a continuous and/or porous lithium storage layer (discussed in more detail later). In some embodiments, one or more or all of the lithium storage layers, optionally continuous and/or porous lithium storage layers, may include silicon, germanium, tin or alloys thereof. In some embodiments one or more or all of the lithium storage layers, optionally continuous and/or porous lithium storage layers, include at least 40 atomic % silicon, germanium, or a combination thereof. In some embodiments, one or more or all of the lithium storage layers, optionally continuous and/or porous lithium storage layers, are provided by a chemical vapor deposition (CVD) process including, but not limited to, hot-wire CVD or a plasma-enhanced chemical vapor deposition (PECVD). In some embodiments, the CVD lithium storage layer deposition process of the first lithium storage layer may reduce a portion of the metal oxide layer to metal. In some embodiments, one or more or all of the lithium storage layers, optionally continuous and/or porous lithium storage layers are provided by a physical vapor deposition (PVD) process including but not limited to sputtering, e-beam, and evaporation methods.

Figure 2:
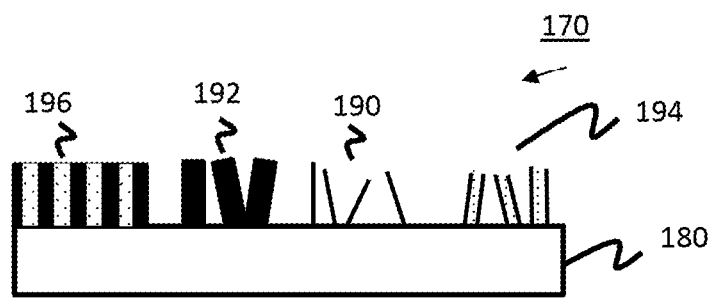
FIG. 2 is a cross-sectional view of a prior art anode having nanostructures.

In the present disclosure, the continuous porous lithium storage layer is substantially free of nanostructures, e.g., in the form of spaced-apart wires, pillars, tubes or the like, or in the form of regular, linear vertical channels extending through the lithium storage layer. FIG. 2 shows a cross-sectional view of a prior art anode 170 that includes some non-limiting examples of nanostructures, such as nanowires 190, nanopillars 192, nanotubes 194 and nanochannels 196 provided over a current collector 180. The term "nanostructure" herein generally refers to an active material structure (for example, a structure of silicon, germanium or their alloys) having at least one cross-sectional dimension that is less than about 2,000 nm, other than a dimension approximately normal to an underlying substrate (such as a layer thickness) and excluding dimensions caused by random pores and channels. Similarly, the terms "nanowires", "nanopillars" and "nanotubes" refers to wires, pillars, and tubes, respectively, at least a portion of which, have a diameter of less than 2,000 nm. "High aspect ratio" nanostructures have an aspect ratio greater than 4:1, where the aspect ratio is generally the height or length of a feature (which may be measured along a feature axis aligned at an angle of 45 to 90 degrees relative to the underlying current collector surface) divided by the width of the feature (which may be measured generally orthogonal to the feature axis). In some embodiments, the continuous porous lithium storage layer is considered "substantially free" of nanostructures when the anode has an average of fewer than 10 nanostructures per 1600 square microns (in which the number of nanostructures is the sum of the number of nanowires, nanopillars, and nanotubes in the same unit area), such nanostructures having an aspect ratio of 4:1 or higher. Alternatively, there is an average of fewer than 1 such nanostructures per 1600 square micrometers. As noted below, the current collector may have a high surface roughness or the surface layer may include nanostructures, but these features are separate from the continuous porous lithium storage layer.

In some embodiments, deposition conditions are selected in combination with the metal oxide so that the continuous porous lithium storage layer is relatively smooth providing an anode with diffuse or total reflectance of at least 10% at 550 nm, alternatively at least 20% (measured at the continuous porous lithium storage layer side). In some embodiments, the anode may have lower reflectance than cited above, for example, by providing a current collector having a rough surface or by modifying deposition conditions of the lithium storage layer.

In some embodiments, the anode may be a continuous foil or sheet but may alternatively be a mesh or have some other 3-dimensional structure. In some embodiments, the anode is flexible.

Figure 3:
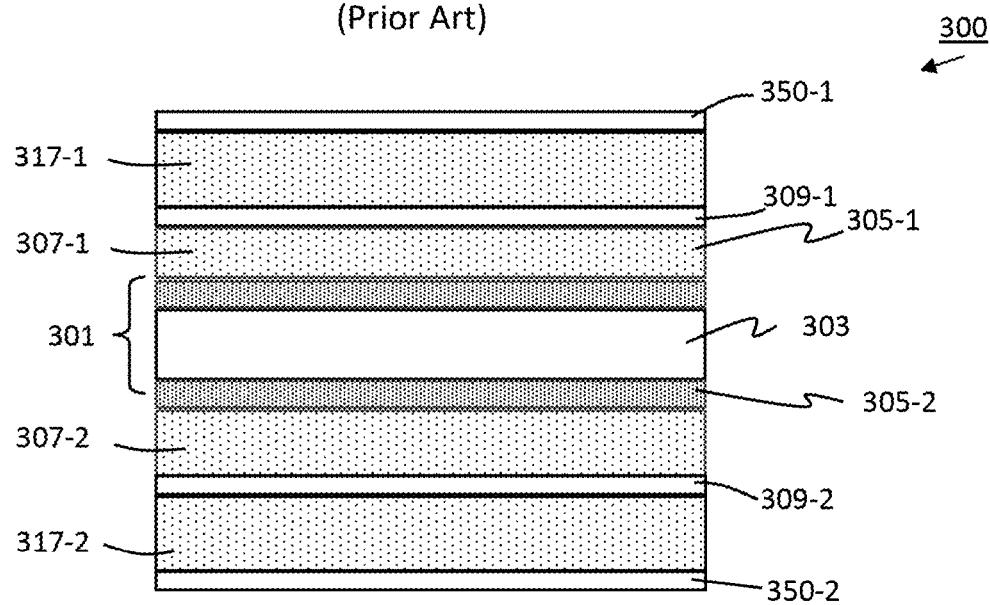
FIG. 3 is a cross-sectional view of an anode according to some embodiments of the present disclosure.

In some embodiments, lithium storage layers are formed on both sides of a current collector, as shown in FIG. 3. The current collector 301 may include electrically conductive layer 303 and metal oxide layers (305-1, 305-2) formed on first and second sides of the electrically conductive layer 303. Over each metal oxide layer, first lithium storage layers (307-1, 307-2) are disposed, along with first intermediate layers (309-1, 309-2), second lithium storage layer (317-1, 317-2), and optional supplemental layers (350-1, 350-2), as described previously to form anode 300. The respective layers on each side (-1, -2) may be the same or different with respect to composition, thickness, porosity or some other property.

Figure 4:
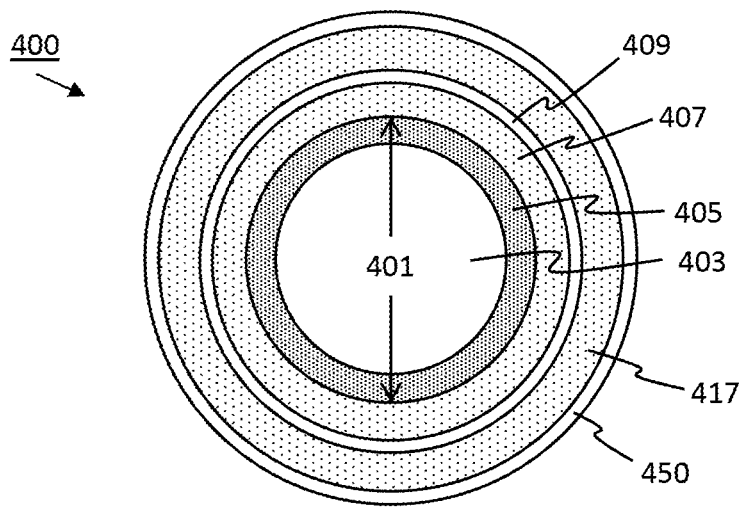
FIG. 4 is a cross-sectional view of an anode according to some embodiments of the present disclosure.

In some embodiments, the current collector may have a mesh structure and a representative cross section is shown in FIG. 4. Current collector 401 may include metal oxide layer 405 substantially surrounding the inner, electrically conductive core 403, e.g., a wire forming part of the mesh, the core acting as an electrically conductive layer. A first lithium storage layer 407 may be provided over the metal oxide layer, an intermediate layer 409 may be provided over the first lithium storage layer 407, a second lithium storage layer 417 may be provided over the first intermediate layer 409 and an optional supplemental layer 450 over the second lithium storage layer 417 to form anode 400. The mesh may be formed from interwoven wires or ribbons of metal or conductive carbon, formed by patterning holes into a substrate, e.g., a metal or metal-coated sheet, or any suitable method known in the art. Although shown as coatings of uniform thickness, the layers of anode 400 may have non-uniform thickness or may not fully surround the core.

Current Collector Current collector (101, 301, 401) includes at least one metal oxide layer (105, 305, 405), and may further include a separate electrically conductive layer (103, 303, 403). The metal oxide may be stoichiometric or non-stoichiometric. The metal oxide layer may include a mixture of metal oxides having homogeneously or heterogeneously distributed oxide stoichiometries, mixtures of metals or both. If the metal oxide layer (105, 305, 405) has sufficient electrical conductivity to function as a current collector, the separate electrically conductive layer (103, 303, 403) is optional. In embodiments using an electrically conductive layer, the metal oxide layer should be sufficiently electrically conductive (e.g., is at least semi-conducting, or non-insulating) to allow transfer of electrical charge between the electrically conductive layer and the continuous porous lithium storage layer. The metal oxide layer may include dopants or regions of unoxidized metal that promote electrical conductivity. In some embodiments the electrically conductive layer may have a conductivity of at least $10^3$ S/m, or alternatively at least $10^6$ S/m, or alternatively at least $10^7$ S/m, and may include inorganic or organic conductive materials or a combination thereof.

In some embodiments, the electrically conductive layer includes a metallic material, e.g., titanium (and its alloys), nickel (and its alloys), copper (and its alloys), or stainless steel. In some embodiments, the electrically conductive layer includes an electrically conductive carbon, such as carbon black, carbon nanotubes, graphene, graphene oxide, reduced graphene oxide, and graphite. In some embodiments the electrically conductive layer may be in the form of a foil or sheet of conductive material, or alternatively a layer deposited onto an insulating substrate (e.g., a polymer sheet coated with conductive material such as nickel or copper, optionally on both sides).

In some embodiments, the electrically conductive layer has an average thickness of at least 0.1 μm, alternatively at least 1 μm, alternatively at least 5 μm. In some embodiments, the electrically conductive substrate has an average thickness in a range of 0.1 μm to 1 μm, alternatively 1 μm to 2 μm, alternatively 2 μm to 5 μm, alternatively 5 μm, to 10 μm, alternatively 10 μm to 15 μm, alternatively 15 μm to 20 μm, alternatively 20 μm to 30 μm, alternatively 30 μm to 50 μm, alternatively 50 μm to 100 μm, or any combination of contiguous ranges thereof.

In some embodiments, the metal oxide layer includes a transition metal oxide, e.g., an oxide of nickel, titanium or copper. In some embodiments, the metal oxide layer includes an oxide of aluminum. In some embodiments, the metal oxide layer is an electrically conductive doped oxide, including but not limited to, indium-doped tin oxide (ITO) or an aluminum-doped zinc oxide (AZO). In some embodiments, the metal oxide layer includes an alkali metal oxide or alkaline earth metal oxide. In some embodiments the metal oxide layer includes an oxide of lithium. As mentioned, the metal oxide layer may include mixtures of metals. For example, an "oxide of nickel" may optionally include other metals in addition to nickel. In some embodiments, the metal oxide layer includes an oxide of an alkali metal or an alkaline earth metal (e.g., lithium or sodium) along with an oxide of a transition metal (e.g., nickel or copper). In some embodiments, the metal oxide layer may include a small amount of hydroxide such that the ratio of oxygen atoms in the form of hydroxide relative to oxide is less than 0.25, respectively.

In some embodiments, the metal oxide layer has an average thickness of at least 0.005 μm, alternatively at least 0.01 μm, alternatively at least 0.02 μm, alternatively at least 0.05 μm, alternatively 0.1 μm, alternatively at least 0.2 μm, alternatively at least 0.5 μm. In some embodiments, the metal oxide layer has an average thickness in a range of about 0.005 μm to about 0.01 μm, alternatively about 0.01 μm to about 0.02 μm, alternatively about 0.02 μm to about 0.05 μm, alternatively about 0.05 μm to about 0.1 μm, alternatively about 0.1 μm to about 0.2 μm, alternatively about 0.2 μm to about 0.5 μm, alternatively about 0.5 μm to about 1 μm, alternatively about 1 μm to about 2 μm, alternatively about 2 μm to about 5 μm, alternatively about 5 μm to about 1 μm, or any combination of contiguous ranges thereof.

The metal oxide layer may include a stoichiometric oxide, a non-stoichiometric oxide, or both. In some embodiments, the metal within the metal oxide layer may exist in multiple oxidation states. In some embodiments the metal oxide layer may have a gradient of oxygen content where the atomic % of oxygen adjacent to an electrically conductive layer is lower than the atomic % adjacent to the lithium storage layer.

In some embodiments, the metal oxide layer is formed directly by atomic layer deposition (ALD), CVD, evaporation, or sputtering. In some embodiments, the electrically conductive layer is a metal layer 103 and the metal oxide layer is formed by oxidizing a portion of the electrically conductive (metal) layer. For example, the metal can be thermally oxidized in the presence of oxygen, electrolytically oxidized, chemically oxidized in an oxidizing liquid or gaseous medium or the like to form the metal oxide layer.

In some embodiments, a metal oxide layer precursor composition may be coated or printed over the electrically conductive layer 103 then treated to form metal oxide layer 105. Some non-limiting examples of metal oxide precursor compositions include sol-gels (metal alkoxides), metal carbonates, metal acetates (including organic acetates), metal hydroxides and metal oxide dispersions. The metal oxide precursor composition may be thermally treated to form the metal oxide layer. In some embodiments, room temperature may be sufficient temperature to thermally treat the precursor. In some embodiments, a metal oxide precursor composition is thermally treated by exposure to a temperature of at least 50° C., alternatively in a range of 50° C. to 150° C., alternatively in a range of 150° C. to 250° C., alternatively in a range of 250° C. to 350° C., alternatively in a range of 350° C. to 450° C., or any combination of these ranges. Thermal treatment time to form the metal oxide layer from the precursor depends on many factors, but may be in a range of about 0.1 min to about 1 min, alternatively about 1 min to about 5 mins, alternatively about 5 mins to about 10 mins, alternatively about 10 mins to about 30 minutes, alternatively about 30 mins to about 60 mins, alternatively about 60 mins to about 90 mins, alternatively in a range of about 90 mins to about 120 mins, or any combination of contiguous ranges thereof. In some embodiments, thermal treatment may be carried out using an oven, infrared heating elements, contact with a heated surface (e.g., a hot plate) or exposure to a flash lamp. In some embodiments, the metal oxide precursor composition is treated by exposure to reduced pressure to form the metal oxide, e.g., to drive off solvents or volatile reaction products. The reduced pressure may be less than 100 Torr, alternatively in a range of 0.1 to 100 Torr. Exposure time to the reduced pressure may be in a range of about 0.1 min to about 1 min, alternatively about 1 min to about 5 mins, alternatively about 5 mins to about 10 mins, alternatively about 10 mins to about 30 minutes, alternatively about 30 mins to about 60 mins, alternatively about 60 mins to about 90 mins, alternatively in a range of about 90 mins to about 120 mins, or any combination of contiguous ranges thereof. In some embodiments, both reduced pressure and thermal treatment may be used.

In some embodiments, the metal oxide layer precursor composition includes a metal, e.g., metal-containing particles, that is treated with an oxidant (e.g., as previously described) under conditions where the oxide layer precursor is readily oxidized but underlying electrically conductive layer is less so. The metal oxide precursor composition may include a metal that is the same as or different from the metal(s) of the electrically conductive layer. In some embodiments, multiple metal precursor compositions may be used to form a pattern of different metal oxides or multilayer structure of different metal oxides.

In some embodiments, the electrically conductive layer includes a mesh or sheet of electrically conductive carbon, including but not limited to, those formed from bundled carbon nanotubes or nanofibers. In some embodiments, such carbon-based electrically conductive layers may include a surface layer of a conductive metal, e.g., nickel, copper, zinc, titanium, or the like. In some embodiments, the conductive metal surface layer may be applied by electrolytic or electroless plating methods. The metal surface layer may be partially or full oxidized to form the corresponding metal oxide layer.

In some embodiments, the metal oxide is formed in the same chamber as, or in line with, a tool used to deposit the continuous porous lithium storage layer. Doped metal oxide layers can be formed by adding dopants or dopant precursors during the metal oxide formation step, or alternatively by adding dopants or dopant precursors to a surface of an electrically conductive layer prior to the metal oxide layer formation step, or alternatively treating a metal oxide layer with a dopant or dopant precursor after initial formation of the metal oxide layer. In some embodiments, the metal oxide layer itself may have some reversible or irreversible lithium storage capacity. In some embodiments, the reversible capacity of the metal oxide layer is lower than that of the continuous porous lithium storage layer. In some embodiments, the metal oxide layer may be porous. In some embodiments, a porous metal oxide may have a density lower than the density of a non-porous metal oxide. In some embodiments, the density of a porous metal oxide is in a range of 50% to 60% of the density of a non-porous metal oxide, alternatively 60% to 70%, alternatively 70% to 80%, alternatively 80% to 90%, alternatively 90% to 95%, alternatively 95% to 99%, or any combination of contiguous ranges thereof.

In some embodiments, the metal oxide may be provided in a pattern over the electrically conductive layer as disclosed in U.S. patent application Ser. No. 16/909,008, the entire contents of which are incorporated herein for all purposes.

In some embodiments, the metal oxide is formed by oxidizing a surface region of a metal substrate, for example, oxidation of a metal foil such as nickel foil. The non-oxidized portion of the metal foil acts as the electrically conductive layer and the oxidized portion corresponds to the metal oxide layer. This method is amenable to high-volume and low-cost production of current collectors. The oxidation conditions depend upon the metal/metal surface, the target oxide thickness and the desired oxide porosity. Unless otherwise stated, any reference to a particular metal includes alloys of that metal. For example, nickel foil may include pure nickel or any alloy of nickel wherein nickel is the primary component. In some embodiments, an alloy metal also oxidizes, and the oxide of nickel formed from the alloy may include that corresponding oxidized metal. In some embodiments, the current collector is formed by oxidation of a nickel substrate, e.g., a nickel foil, in a furnace under air brought to a temperature of at least 300° C., alternatively at least 400° C., for example in a range of about 600° C. to about 900° C., or alternatively higher temperatures. The hold time depends upon the selected temperature and the desired thickness/porosity for the metal oxide layer. Typically, the oxidation hold time will be in a range of about 1 minute to about 2 hours, but shorter or longer times are contemplated. A surface pretreatment step may be applied to promote or otherwise control oxidation. Other metals such as copper and titanium may have other operational hold times, temperatures and pretreatments according to their propensity to be oxidized.

Figure 5:
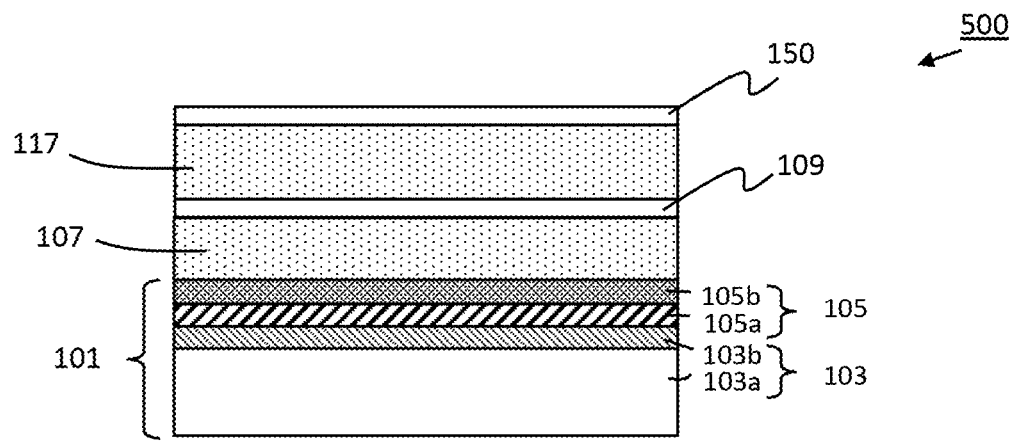
FIG. 5 is a cross-sectional view of an anode according to some embodiments of the present disclosure.

The current collector may have an electrically conductive layer that includes two or more sublayers differing in chemical composition. For example, the current collector may include metallic copper foil as a first electrically conductive sublayer, a second electrically conductive sublayer of metallic nickel provided over the copper, and a layer of a nickel oxide over the metallic nickel. As mentioned previously, the metallic copper and nickel may be in the form of alloys. Similarly, the metal oxide layer may include two or more sublayers differing in chemical composition. For example, the current collector may include a metallic copper foil, a layer of a copper oxide over the copper foil and a layer of titanium dioxide over the copper oxide. FIG. 5 is a cross sectional view that illustrates these embodiments. Anode 500 of FIG. 5 is similar to anode 100A of FIG. 1A except that electrically conductive layer 103 is divided into first and second electrically conductive sublayers 103a and 103b, respectively, and metal oxide layer 105 is divided into first and second metal oxide sublayers 105a and 105b, respectively. Such sublayers may be discrete or take the form of a gradient in chemical composition. In some embodiments there may be a gradient or transition zone between the electrically conductive layer(s) and the metal oxide layer(s).

In some embodiments (not shown), a current collector precursor may initially have an electrically conductive layer having two metal sublayers such that the second sublayer at the surface is more easily oxidized than the underlying first metal sublayer. Under oxidation conditions to form the current collector, only the second sublayer oxidizes (all or just a portion). This may allow for better control of the thickness of the metal oxide layer.

Lithium Storage Layer

A lithium storage layer includes a material capable of reversibly incorporating lithium. A lithium storage layer may be porous. In some embodiments, a lithium storage layer may include silicon, germanium, tin, antimony, or a combination thereof. In some embodiments, a lithium storage layer is substantially amorphous. In some embodiments a lithium storage layer includes substantially amorphous silicon. Such substantially amorphous storage layers may include a small amount (e.g., less than 20 atomic %) of crystalline material dispersed therein. A lithium storage layer may include dopants such as hydrogen, boron, phosphorous, sulfur, fluorine, aluminum, gallium, indium, arsenic, antimony, bismuth, nitrogen, or metallic elements. In some embodiments a lithium storage layer may include porous substantially amorphous hydrogenated silicon (a-Si:H), having, e.g., a hydrogen content of from 0.1 to 20 atomic %, or alternatively higher. In some embodiments, a lithium storage layer may include methylated amorphous silicon. Note that, unless referring specifically to hydrogen content, any atomic % metric used herein for a lithium storage material or layer refers to all atoms other than hydrogen.

In some embodiments, a lithium storage layer includes at least 40 atomic % silicon, germanium or a combination thereof, alternatively at least 50 atomic %, alternatively at least 60 atomic %, alternatively at least 70 atomic %, alternatively, at least 80 atomic %, alternatively at least 90 atomic %. In some embodiments, a lithium storage layer includes at least 40 atomic % silicon, alternatively at least 50 atomic %, alternatively at least 60 atomic %, alternatively at least 70 atomic %, alternatively, at least 80 atomic %, alternatively at least 90 atomic %.

In some embodiments, a lithium storage layer includes less than 10 atomic % carbon, alternatively less than 5 atomic %, alternatively less than 2 atomic %, alternatively less than 1 atomic %. In some embodiments, a lithium storage layer includes less than 5% by weight of carbon-based binders, graphitic carbon, graphene, graphene oxide, reduced graphene oxide, carbon nanotubes, carbon black, and conductive carbon.

In some embodiments, a lithium storage layer may be a porous lithium storage layer that includes voids or interstices (pores), which may be random or non-uniform with respect to size, shape and distribution. Such porosity does not result in, or result from, the formation of any recognizable nanostructures such as nanowires, nanopillars, nanotubes, nanochannels or the like. In some embodiments, the pores are polydisperse. In some embodiments, when analyzed by SEM cross section, 90% of pores larger than 100 nm in any dimension are smaller than about 5 µm in any dimension, alternatively smaller than about 3 µm, alternatively smaller than about 2 µm. In some embodiments, the lithium storage layer may include some pores that are smaller than 100 nm in any dimension, alternatively smaller than 50 nm in any dimension, alternatively smaller than 20 nm in any dimension. In some embodiments the lithium storage layer has an average density in a range of 1.0-1.1 g/cm³, alternatively 1.1-1.2 g/cm³, alternatively 1.2-1.3 g/cm³, alternatively 1.3-1.4 g/cm³, alternatively 1.4-1.5 g/cm³, alternatively 1.5-1.6 g/cm³, alternatively 1.6-1.7 g/cm³, alternatively 1.7-1.8 g/cm³, alternatively 1.8-1.9 g/cm³, alternatively 1.9-2.0 g/cm³, alternatively 2.0-2.1 g/cm³, alternatively 2.1-2.2 g/cm³, alternatively 2.2-2.25 g/cm³, or any combination of contiguous ranges thereof, and includes at least 40 atomic % silicon, alternatively at least 50 atomic % silicon, alternatively at least 60 atomic % silicon, alternatively at least 70 atomic % silicon, alternatively 80 atomic % silicon, alternatively at least 90 atomic % silicon, alternatively at least 95 atomic % silicon.

Figure 6:
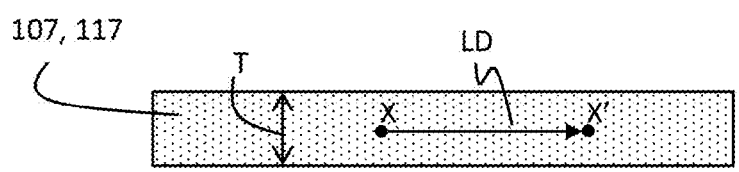
FIG. 6 is a cross-sectional view of a lithium storage layer according to some embodiments of the present disclosure.

In some embodiments, a lithium storage layer may be a continuous lithium storage layer. In some embodiments, a lithium storage layer may be both continuous and porous (a continuous porous lithium storage layer). The majority of active material (e.g., silicon, germanium, tin, antimony, or alloys thereof) of a continuous lithium storage layer has substantial lateral connectivity across portions of the current collector, such connectivity extending around random pores and interstices (in the case of a continuous porous lithium storage layer). Referring to FIG. 6, there is shown a continuous lithium storage layer (for example, 107, 117). In some embodiments, "substantial lateral connectivity" means that active material at one point X in the continuous lithium storage layer 107 may be connected to active material at a second point X' in the layer at a straight-line lateral distance LD that is at least as great as the thickness T of the continuous lithium storage layer, alternatively, a lateral distance at least 2 times as great as the thickness, alternatively, a lateral distance at least 3 times as great as the thickness. Not shown, the total path distance of material connectivity, including circumventing pores in the case of a continuous porous lithium storage layer, may be longer than LD. In some embodiments, the continuous lithium storage layer may be described as a matrix of interconnected silicon, germanium, or alloys thereof, and in the case of a continuous porous lithium storage layer, with random pores and interstices embedded therein. In some embodiments, the continuous porous lithium storage layer has a sponge-like form. In some embodiments, about 75% or more of the metal oxide layer surface is contiguous with the first lithium storage layer, at least prior to electrochemical formation. It should be noted that a continuous lithium storage layer does not necessarily extend across the entire anode without any lateral breaks and may include random discontinuities or cracks and still be considered continuous.

In some embodiments, a lithium storage layer, optionally a continuous and/or porous lithium storage layer, includes a substoichiometric oxide of silicon ($SiO_x$), germanium ($GeO_x$) or tin ($SnO_x$) wherein the ratio of oxygen atoms to silicon, germanium, or tin atoms is less than 2:1, i.e., x<2, alternatively less than 1:1, i.e., x<1. In some embodiments, x is in a range of 0.02 to 0.95, alternatively 0.02 to 0.10, alternatively 0.10 to 0.50, or alternatively 0.50 to 0.95, alternatively 0.95 to 1.25, alternatively 1.25 to 1.50.

In some embodiments, a lithium storage layer, optionally a continuous and/or porous lithium storage layer, includes a substoichiometric nitride of silicon ($SiN_y$), germanium ($GeN_y$), or tin ($SnN_y$) wherein the ratio of nitrogen atoms to silicon, germanium or tin atoms is less than 1.25:1, i.e., y<1.25. In some embodiments, y is in a range of 0.02 to 0.95, alternatively 0.02 to 0.10, alternatively 0.10 to 0.50, or alternatively 0.50 to 0.95, alternatively 0.95 to 1.25.

In some embodiments, a lithium storage layer, optionally a continuous and/or porous lithium storage layer, includes a sub stoichiometric oxynitride of silicon ($SiO_xN_y$), germanium ($GeO_xN_y$), or tin ($SnO_xN_y$) wherein the ratio of total oxygen and nitrogen atoms to silicon, germanium or tin atoms is less than 1:1, i.e., (x+y)<1. In some embodiments, (x+y) is in a range of 0.02 to 0.95, alternatively 0.02 to 0.10, alternatively 0.10 to 0.50, or alternatively 0.50 to 0.95.

In some embodiments, the above sub-stoichiometric oxides, nitrides or oxynitrides are provided by a CVD process, including but not limited to, a PECVD process. The oxygen and nitrogen may be provided uniformly within the lithium storage layer, or alternatively the oxygen or nitrogen content may be varied as a function of storage layer thickness.

Figure 7:
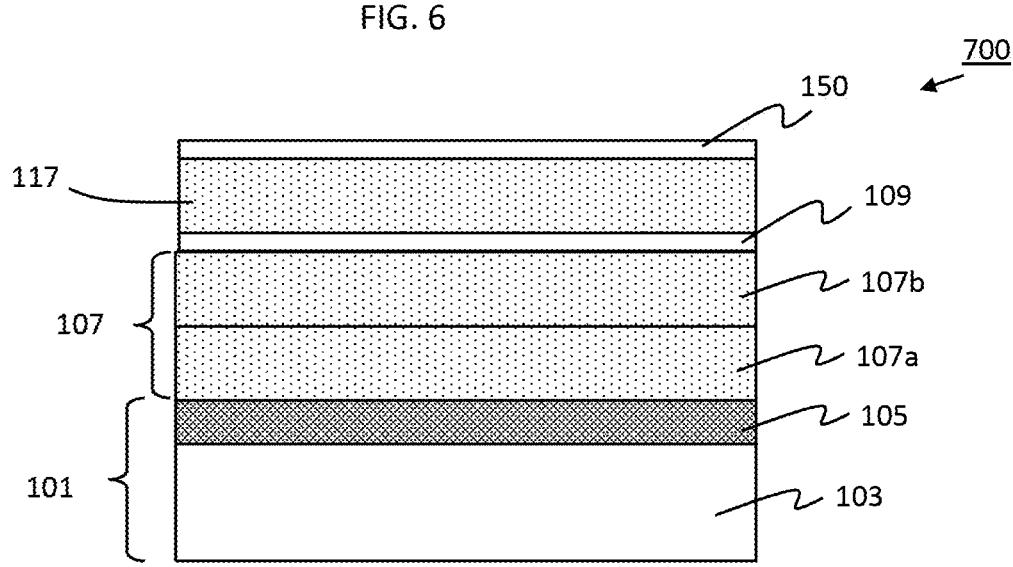
FIG. 7 is a cross-sectional view of an anode according to some embodiments of the present disclosure.

In some embodiments, a lithium storage layer may include two or more sublayers, optionally continuous and/or porous lithium storage sublayers. For example, referring to FIG. 7, the first lithium storage layer 107 of anode 700 may include a plurality of lithium storage sublayers (107a and 107b) having different physical properties or chemical compositions, and independently selected from any of the embodiments discussed above. For example, lithium storage sublayer 107a may include amorphous silicon with low oxygen content and lithium storage sublayer 107b may include a suboxide of silicon, $SiO_x$, with x in a range of 0.02 to 0.95. Alternatively, the compositions of 107a and 107b could be reversed. In another example, lithium storage sublayer 107a may include amorphous silicon with low germanium and lithium storage sublayer 107b includes a higher atomic % germanium than 107a. In some embodiments, the sublayers may have different amounts or types of dopants. In some other embodiments, lithium storage layers 107a and 107b have similar chemical compositions, but the density of 107a is higher than 107b. These are just a few non-limiting examples. In some embodiments, the second lithium storage layer includes sublayers, or both the first and second lithium storage layers include sublayers. Many other combinations are possible. Although two sublayers are shown in FIG. 7, three or more sublayers may instead be used.

In some embodiments, the lithium storage layer, optionally a continuous and/or porous lithium storage layer, includes a gradient of components, density, or porosity, or a combination thereof, as a function of layer thickness. For example, the lithium storage layer 107 may include amorphous silicon having a density higher near the metal oxide layer 105 than further away from the metal oxide layer, or vice versa.

The thickness or mass per unit area of the lithium storage layer (optionally continuous and/or porous) depends on the storage material, desired charge capacity and other operational and lifetime considerations. Increasing the thickness typically provides more capacity. If the lithium storage layer becomes too thick, electrical resistance may increase and the stability may decrease. In some embodiments, the anode may be characterized as having an active silicon areal density of at least 0.5 mg/cm$_2$, alternatively at least 1.0 mg/cm$_2$, alternatively at least 1.5 mg/cm$_2$, alternatively at least 3 mg/cm$_2$, alternatively at least 5 mg/cm$_2$. In some embodiments, the lithium storage structure may be characterized as having an active silicon areal density in a range of 0.5-1.5 mg/cm$^2$, alternatively 1.5-2 mg/cm$^2$, alternatively in a range of 2-3 mg/cm$^2$, alternatively in a range of 3-5 mg/cm$^2$, alternatively in a range of 5-10 mg/cm$^2$, alternatively in a range of 10-15 mg/cm$^2$, alternatively in a range of 15-20 mg/cm$^2$, or any combination of contiguous ranges thereof. "Active areal silicon density" refers to the silicon in electrical communication with the current collector that is available for reversible lithium storage at the beginning of cell cycling, e.g., after anode "electrochemical formation" discussed later. "Areal" of this term refers to the surface area of the electrically conductive layer over which active silicon is provided. In some embodiments, not all of the silicon content is active silicon, i.e., some may be tied up in the form of non-active silicides or electrically isolated from the current collector.

In some embodiments the lithium storage layer (optionally continuous and/or porous) has an average thickness of at least 0.5 μm, alternatively ate least 1 μm, alternatively at least 3 μm, alternatively at least 7 μm. In some embodiments, the lithium storage layer (optionally continuous and/or porous) has an average thickness in a range of about 0.5 μm to about 50 μm. In some embodiments, the lithium storage layer (optionally continuous and/or porous) comprises at least 85 atomic % amorphous silicon and has a thickness in a range of 0.5 to 1 μm, alternatively 1-2 μm, alternatively 2-4 μm, alternatively 4-7 μm, alternatively 7-10 μm, alternatively 10-15 μm, alternatively 15-20 μm, alternatively 20-25 μm, alternatively 25-30 μm, alternatively 30-40 μm, alternatively 40-50 μm, or any combination of contiguous ranges thereof.

In some embodiments, the lithium storage layer (optionally continuous and/or porous) includes silicon but does not contain a substantial amount of crystalline silicides, i.e., the presence of silicides is not readily detected by X-Ray Diffraction (XRD). Metal silicides, e.g., nickel silicide, commonly form when silicon is deposited at higher temperatures directly onto metal, e.g., nickel foil. Metal silicides such as nickel silicides often have much lower lithium storage capacity than silicon itself. In some embodiments, the average atomic % of silicide-forming metallic elements within the lithium storage layer are on average less than 35%, alternatively less than 20%, alternatively less than 10%, alternatively less than 5%. In some embodiments, the average atomic % of silicide-forming metallic elements within the lithium storage layer are in a range of about 0.01% to about 10%, alternatively about 0.05 to about 5%. In some embodiments, the atomic % of silicide forming metallic elements in the lithium storage layer is higher nearer the current collector than away from the current collector.

Additional Lithium Storage Layers

The generally planar nature of some embodiments of the present anode further allows simple coating of additional lithium storage layers that are not continuous porous lithium storage layers as described herein. For example, conventional lithium-ion battery slurries based on carbon that may optionally further include silicon particles, may be coated over the topmost lithium storage layer of the present disclosure, optionally a continuous and/or porous lithium storage layer, to further enhance charge capacity. Coating methods may include curtain coating, slot coating, spin coating, ink jet coating, spray coating, or any other suitable method.

CVD

CVD generally involves flowing a precursor gas, a gasified liquid in terms of direct liquid injection CVD or gases and liquids into a chamber containing one or more objects, typically heated, to be coated. Chemical reactions occur on and near the hot surfaces, resulting in the deposition of a thin film on the surface. This is accompanied by the production of chemical by-products that are exhausted out of the chamber along with unreacted precursor gases. As would be expected with the large variety of materials deposited and the wide range of applications, there are many variants of CVD that may be used to form the lithium storage layer, the metal oxide layer, an intermediate layer, a supplemental layer (see below) or some other layer. It may be done in hot-wall reactors or cold-wall reactors, at sub-torr total pressures to above-atmospheric pressures, with and without carrier gases, and at temperatures typically ranging from 100-1600° C. in some embodiments. There are also a variety of enhanced CVD processes, which involve the use of plasmas, ions, photons, lasers, hot filaments, or combustion reactions to increase deposition rates and/or lower deposition temperatures. Various process conditions may be used to control the deposition, including but not limited to, temperature, precursor material, gas flow rate, pressure, substrate voltage bias (if applicable), and plasma energy (if applicable).

As mentioned, the lithium storage layer (optionally continuous and/or porous), e.g., a layer of silicon or germanium or both, may be provided by plasma-enhanced chemical vapor deposition (PECVD). Relative to conventional CVD, deposition by PECVD can often be done at lower temperatures and higher rates, which can be advantageous for higher manufacturing throughput. In some embodiments, the PECVD is used to deposit a substantially amorphous silicon layer (optionally doped) over the metal oxide layer. In some embodiments, PECVD is used to deposit a substantially amorphous continuous porous silicon layer over the metal oxide layer.

PECVD

In PECVD processes, according to various implementations, a plasma may be generated in a chamber in which the substrate is disposed or upstream of the chamber and fed into the chamber. Various types of plasmas may be used including, but not limited to, capacitively-coupled plasmas, inductively-coupled plasmas, and conductive coupled plasmas. Any appropriate plasma source may be used, including DC, AC, RF, VHF, combinatorial PECVD and microwave sources may be used. Some non-limiting examples of useful PECVD tools include hollow cathode tube PECVD, magnetron confined PECVD, inductively coupled plasma chemical vapor deposition (ICP-PECVD, sometimes called HDPECVD, ICP-CVD or HDCVD), and expanding thermal plasma chemical vapor deposition (ETP-PECVD).

PECVD process conditions (temperatures, pressures, precursor gases, carrier gasses, dopant gases, flow rates, energies, and the like) can vary according to the particular process and tool used, as is well known in the art In some implementations, the PECVD process is an expanding thermal plasma chemical vapor deposition (ETP-PECVD) process. In such a process, a plasma generating gas is passed through a direct current arc plasma generator to form a plasma, with a web or other substrate including the current collector optionally in an adjoining vacuum chamber. A silicon source gas is injected into the plasma, with radicals generated. The plasma is expanded via a diverging nozzle and injected into the vacuum chamber and toward the substrate. An example of a plasma generating gas is argon (Ar). In some embodiments, the ionized argon species in the plasma collide with silicon source molecules to form radical species of the silicon source, resulting in deposition onto the current collector. Example ranges for voltages and currents for the DC plasma source are 60 to 80 volts and 40 to 70 amperes, respectively.

Any appropriate silicon source may be used to deposit silicon, including silane ($SiH_4$), dichlorosilane ($H_2SiCl_2$), monochlorosilane ($H_3SiCl$), trichlorosilane ($HSiCl_3$), silicon tetrachloride ($SiCl_4$), and diethylsilane. Depending on the gas(es) used, the silicon layer may be formed by decomposition or reaction with another compound, such as by hydrogen reduction. In some embodiments, the gases may include a silicon source such as silane, a noble gas such as helium, argon, neon, or xenon, optionally one or more dopant gases, and substantially no hydrogen. In some embodiments, the gases may include argon, silane, and hydrogen, and optionally some dopant gases. In some embodiments the gas flow ratio of argon relative to the combined gas flows for silane and hydrogen is at least 3.0, alternatively at least 4.0. In some embodiments, the gas flow ratio of argon relative to the combined gas flows for silane and hydrogen is in a range of 3-5, alternatively 5-10, alternatively 10-15, alternatively 15-20, or any combination of contiguous ranges thereof. In some embodiments, the gas flow ratio of hydrogen gas to silane gas is in a range of 0-0.1, alternatively 0.1-0.2, alternatively 0.2-0.5, alternatively 0.5-1, alternatively 1-2, alternatively 2-5, or any combination of contiguous ranges thereof. In some embodiments, higher porosity silicon may be formed and/or the rate of silicon deposition may be increased when the gas flow ratio of silane relative to the combined gas flows of silane and hydrogen increases. In some embodiments a dopant gas is borane or phosphine, which may be optionally mixed with a carrier gas. In some embodiments, the gas flow ratio of dopant gas (e.g., borane or phosphine) to silicon source gas (e.g., silane) is in a range of 0.0001-0.0002, alternatively 0.0002-0.0005, alternatively 0.0005-0.001, alternatively 0.001-0.002, alternatively 0.002-0.005, alternatively 0.005-0.01, alternatively 0.01-0.02, alternatively 0.02-0.05, alternatively 0.05-0.10, or any combination of contiguous ranges thereof. Such gas flow ratios described above may refer to the relative gas flow, e.g., in standard cubic centimeter per minute (SCCM). In some embodiments, the PECVD deposition conditions and gases may be changed over the course of the deposition.

In some embodiments, the temperature at the current collector during at least a portion of the time of PECVD deposition is in a range of 100° C. to 200° C., alternatively 200° C. to 300° C., alternatively 300° C. to 400° C., alternatively 400° C. to 500° C., alternatively 500° C. to 600° C., alternatively 600° C. to 700° C. or any combination of contiguous ranges thereof. In some embodiments, the temperature may vary during the time of PECVD deposition. For example, the temperature during early times of the PECVD may be higher than at later times. Alternatively, the temperature during later times of the PECVD may be higher than at earlier times.

Intermediate Layer(s)

In some embodiments, the intermediate layer(s) of the present disclosure provide functionality to the anode that directly or indirectly may improve one or more of: electrical conductivity (lower resistivity), cycling stability, physical robustness, and lithium storage capacity. In some embodiments, the intermediate layer(s) may have some reversible lithium storage capacity, but lower than the total lithium storage capacity of the lithium storage layers in units of $mAh/cm^2$ or $mAh/g$. In some embodiments, the combined reversible lithium storage capacity of the intermediate layer(s) is less than 25% of the combined lithium storage capacity of the lithium storage layers, alternatively less than 10%, alternatively less than 105 alternatively less than 2%, alternatively less than 1%.

In some embodiments, the thickness of the thickest intermediate layer is less than the thickness of the thinnest lithium storage layer. In some embodiments, the thickness of the thickest intermediate layer is less than 50% of the thickness of the thinnest lithium storage layer, alternatively less than 25%, alternatively less than 10%, alternatively less than 5%, alternatively less than 2%. In some embodiments, the combined thickness of the intermediate layer(s) is less than the combined thickness of the lithium storage layers. In some embodiments, the combined thickness of the intermediate layer(s) may be less than 50% of the combined thickness of the lithium storage layers, alternatively less than 25%, alternatively less than 10%, alternatively less than 5%, alternatively less than 2%.

In some embodiments, the thickness of an intermediate layer may be less than 2000 nm, alternatively less than 1000 nm, alternatively less than 500 nm, alternatively less than 250 nm, alternatively less than 100 nm, alternatively less than 50 nm, alternatively less than 30 nm, alternatively less than 20 nm, alternatively less than 12 nm, alternatively less than 5 nm, alternatively less than 2 nm. In some embodiments, the thickness of an intermediate layer may be in a range of 2 nm to 12 nm, alternatively in a range of 12 nm to 20 nm, alternatively in a range of 20 nm to 30 nm, alternatively in a range of 30 nm to 50 nm, alternatively in a range of 30 nm to 100 nm, alternatively in a range of 100 nm to 250 nm, alternatively in a range of 250 nm to 500 nm, alternatively in a range of 500 to 1000 nm, alternatively in a range of 1000 nm to 2000 nm, or any combination of two or more contiguous ranges thereof.

In some embodiments, an intermediate layer has a higher electrical conductivity than an adjacent lithium storage layer. In some embodiments, an intermediate layer is electrically conductive or semiconductive. In some embodiments an intermediate layer has an electrical conductivity, or upon electrochemical formation or cycling forms a material having an electrical conductivity, of at least 0.01 S/m, alternatively at least 0.1 S/m, alternatively at least 1 S/m, alternatively at least 10 S/m, alternatively at least 100 S/m, alternatively at least $10^3$ S/m, or alternatively at least $10^6$ S/m, or alternatively at least 10'S/m.

In some embodiments, an intermediate layer may include a carbon material. Herein, a carbon material is one where carbon represents the highest atomic % of elements within the material. Carbon materials may include, but are not limited to, diamond, carbon black, graphite, graphene, graphene oxide, or fullerene. In some embodiments, the carbon material may be an electrically conductive or semi-conductive carbon. In some embodiments, the carbon material may be in the form of nanoparticles, nanofibers, nanotubes, sheets, platelets, or a combination thereof. In some embodiments, the carbon material may be dispersed in a binder and coated to form an intermediate layer. In some embodiments, an intermediate layer including a carbon material may be formed by depositing a carbon precursor material, e.g., an organic material, and pyrolyzing the organic material to form the carbon material. In some embodiments, an intermediate layer including the carbon material may be formed by a CVD process.

In some embodiments, an intermediate layer may include an electrically conductive metal. In some embodiments, the intermediate layer may include a transition metal, e.g., Ni, Cu, Ag, Zn, Mo, Au, Ti, Cr, Mn, Ta, Ti, V, Fe, or Co. In some embodiments, the intermediate layer including an electrically conductive metal may be deposited by a PVD process, a CVD process, electroless plating, thermal transfer from a donor sheet, or coating or printing from a solution or dispersion. In some embodiments, a metal compound precursor may be coated or printed onto a lithium storage layer and then treated to form the electrically conductive metal, e.g., by a thermal treatment or chemical reduction reaction.

In some embodiments, an intermediate layer may include a metal oxide as described above for the metal oxide layer, including methods of its formation or deposition. In some embodiments, an intermediate layer may include any of the materials described below that may be used for the optional supplemental layer, including methods of its deposition. In some embodiments, an intermediate layer may include substantially stoichiometric silicon nitride. In some embodiments, an intermediate layer may include a metal nitride. In some embodiments, an intermediate layer may include a metal oxynitride. In some embodiments, an intermediate layer may include a metal sulfide or a metal oxysulfide. In some embodiments, an intermediate layer may include a lithium-containing material. In some embodiments, an intermediate layer may include a metalcone. In some embodiments, the anode includes a supplemental layer having the same chemical composition as an intermediate layer.

In some embodiments, the intermediate layer has a total content of silicon, germanium, tin, antimony, or a combination thereof, of less than 20 atomic %, alternatively less than 10 atomic %, alternatively less than 5 atomic %, alternatively less than 2 atomic %.

In some embodiments the anode may be thermally treated, for example, to cause a chemical transformation of the intermediate layer (for example, driving off a solvent or a reaction product in the case of an intermediate layer precursor such as a metal oxide precursor), doping of an adjacent lithium storage layer, or improved layer adhesion. Such thermal treatment may happen during deposition of the intermediate layer, after such deposition, or after deposition on overlying lithium storage layer. In some embodiments the anode may be thermally treated prior to battery assembly (after deposition of all anode layers is complete, but before the anode is combined with a cathode in a battery cell), with or without a pre-lithiation step. In some embodiments, thermally treating the anode may improve adhesion of the various layers, electrical conductivity, or areal capacity. In some embodiments, thermally treating the anode may be done in a controlled environment, e.g., under vacuum, argon, or nitrogen having a low oxygen and water content (e.g., less than 100 ppm or partial pressure of less than 10 Torr, alternatively less than 1 Torr, alternatively less than 0.1 Torr to prevent degradation). Herein, "under vacuum" generally refers to a reduced pressure condition wherein the total pressure of all gasses (e.g. in a vacuum oven) is less than 10 Torr. Due to equipment limitations, the vacuum pressure is typically greater than about $10^{-8}$ Torr. In some embodiments, anode thermal treatment may be carried out using an oven, a tube furnace, infrared heating elements, contact with a hot surface (e.g. a hot plate), or exposure to a flash lamp. The anode thermal treatment temperature and time depend on the materials of the anode. In some embodiments, anode thermal treatment includes heating the anode to a temperature of at least 50° C., optionally in a range of 50° C. to 600° C., alternatively 100° C. to 250° C., alternatively 250° C. to 350° C., alternatively 350° C. to 450° C., alternatively 450° C. to 600° C., alternatively 600° C. to 700° C., alternatively 700° C. to 800° C., or any combination of contiguous ranges thereof. In some embodiments, the anode thermal treatment time may be in a range of about 0.1 min to about 1 min, alternatively about 1 min to about 5 mins, alternatively about 5 mins to about 10 mins, alternatively about 10 mins to about 30 minutes, alternatively about 30 mins to about 60 mins, alternatively about 60 mins to about 90 mins, alternatively in a range of about 90 mins to about 120 mins, or any combination of contiguous ranges thereof.

Figure 8:
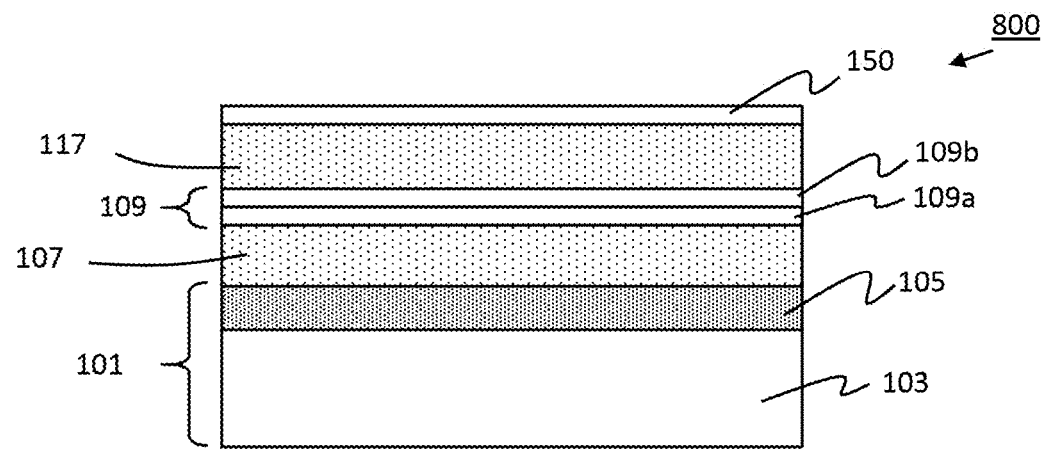
FIG. 8 is a cross-sectional view of an anode according to some embodiments of the present disclosure.

In some embodiments, an intermediate layer may include two or more intermediate sublayers having different chemical compositions, independently selected from any of the materials mentioned above regarding the intermediate layer. For example, as shown in FIG. 8, intermediate layer 109 of anode 800 may include intermediate first sublayer 109a provided over, and optionally in contact with, lithium storage layer 107, and intermediate second sublayer 109b provided over, and optionally in contact with, intermediate sublayer 109a. Second lithium storage layer 117 may be provided over, and optionally in contact with, the intermediate second sublayer 109b. In some embodiments, intermediate first sublayer 109a may include a metal and the intermediate second sublayer 109b may include a metal oxide. In some embodiments, a metal element of a metal-containing intermediate first sublayer 109a may be the same metal element of a metal oxide-containing intermediate second sublayer 109b. In some embodiments, the intermediate first sublayer 109a may include a metal and the intermediate second sublayer 109b may include a metal oxide formed by partially oxidizing the intermediate first sublayer. In some embodiments, the intermediate first sublayer 109a and intermediate second sublayer 109b may include different metal oxides. In some embodiments, the intermediate first sublayer 109a may include a metal oxide and the intermediate second sublayer 109b may include a metal. In some embodiments at least one intermediate sublayer may include substantially stoichiometric silicon nitride. In some embodiments, at least one intermediate sublayer may include a metal. In some embodiments, at least one intermediate sublayer may include a metal oxide. In some embodiments, at least one intermediate sublayer may include a metal nitride. In some embodiments, at least one intermediate sublayer may include a metal oxynitride. In some embodiments, at least one intermediate sublayer may include a carbon material. In some embodiments, at least one intermediate sublayer may include a lithium-containing material. In some embodiments, at least one intermediate sublayer may include a metalcone.

Figure 9A:
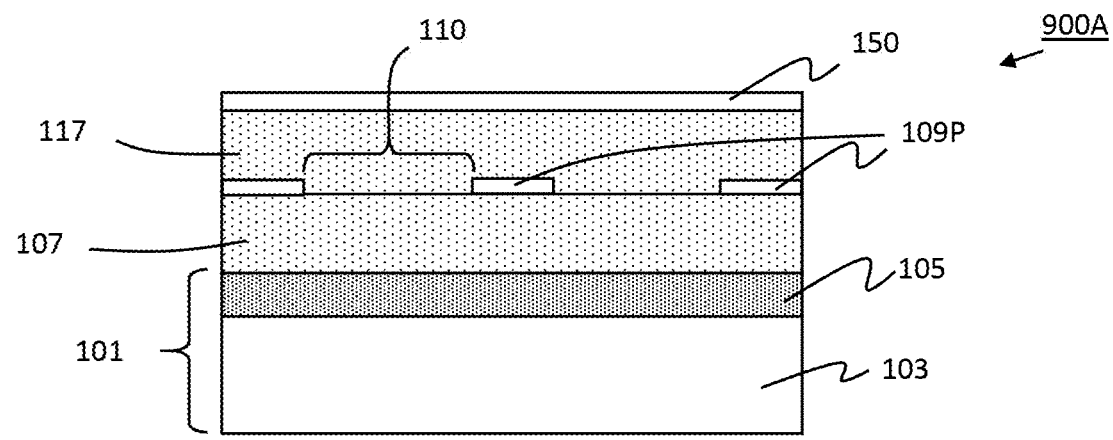
FIG. 9A is a cross-sectional view of an anode according to some embodiments of the present disclosure.
Figure 9B:
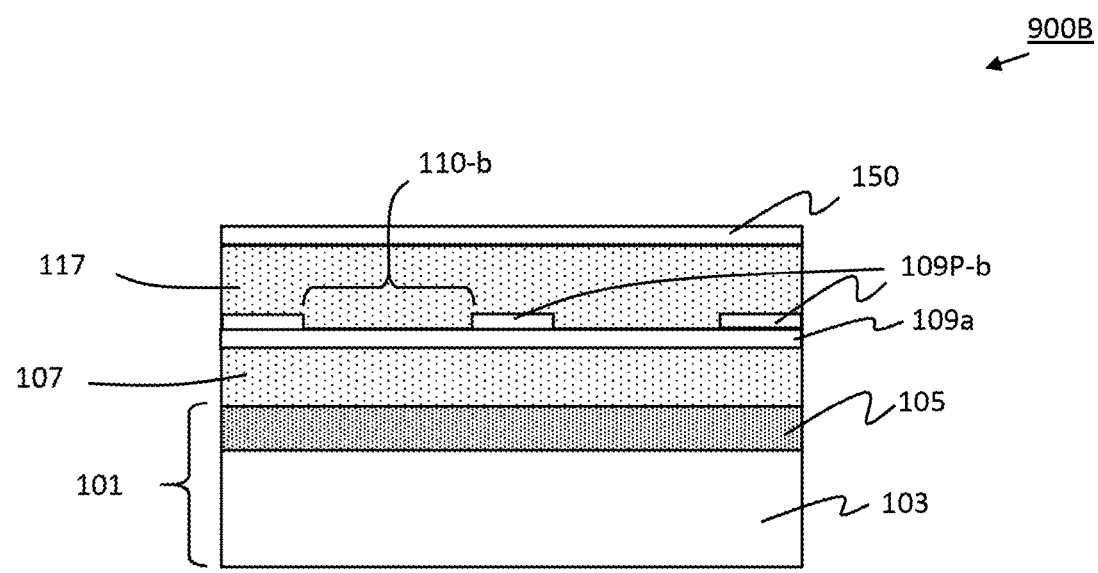
FIG. 9B is a cross-sectional view of an anode according to some embodiments of the present disclosure.

In some embodiments, one or more intermediate layers or sublayers may be patterned. For example, as shown in FIG. 9A, the intermediate layer of anode 900A is patterned into one or more patterned portions 109P. One or more open areas 110 are between patterned portions 109P and are occupied by second lithium storage layer 117. In some embodiments as shown in FIG. 9A, two lithium storage layers may be in contact with each other in the open areas 110. In some embodiments, as shown in FIG. 9B, an intermediate layer of anode 900B may include a first sublayer 109a that is not patterned and a second sublayer into one or more patterned portions 109P-b. The one or more patterned portions 109P-b may define one or more open areas 110-b, which are occupied by second lithium storage layer 117. Alternatively, in some embodiments (not shown), the first sublayer may be patterned and the second sublayer is not. Alternatively, in some embodiments (not shown) first and second sublayers may be patterned to have substantially the same or different patterns.

Numerous methods may be used to form a patterned intermediate layer or sublayer. In some embodiments an intermediate layer material or precursor may be pattern-applied over a lithium storage layer, for example, by inkjet printing, offset lithographic printing, gravure printing, screen printing, thermal transfer from a donor sheet, patterned laser deposition, or deposition through a shadow mask, just to name a few. In some embodiments an intermediate layer or sublayer may be deposited as a non-patterned layer and patterned using photolithographic, lift-off, or other patterning methods.

The intermediate layer structure should allow electrical charge to pass between the current collector and the topmost lithium storage layer. The intermediate layer structure may include an unpatterned intermediate layer and a patterned intermediate layer together with the material deposited between the patterned portions of the intermediate layer. If an intermediate layer or sublayer has insufficient electrical conductivity, it may be patterned to allow electrical charge to flow through the open areas. In some embodiments, an intermediate layer may readily allow lithium to migrate between layers. In some embodiments, an intermediate layer or sublayer may slow or partially slow lithium migration between layers, and in such case, may optionally be patterned to allow lithium migration through open areas. The resulting patterned intermediate layer may then be an intermediate layer structure that allows lithium migration through even if the intermediate layer itself does not. Similarly, the intermediate layer structure may have be electrically conductive even if the intermediate layer itself is not.

In some embodiments an intermediate layer may function to at least partially restrict expansion of the lithium storage layer during lithiation or electrochemical cycling, thereby lessening the degree of pulverization.

In some embodiments, an intermediate layer may function to distribute electrical charge more uniformly throughout the anode.

In some embodiments, an intermediate layer may enable controlled delamination or partial delamination of an upper (for example second) lithium storage layer from a lower (for example first) lithium storage layer during lithiation or electrochemical cycling. In some embodiments where such controlled delamination occurs, the intermediate layer may assist in maintaining electrical continuity with the upper lithium storage material thereby preserving charge capacity and/or cycling stability. In some embodiments where controlled delamination occurs, the intermediate layer may assist in stabilizing lithium storage layer material (e.g., silicon) by acting as a barrier to direct contact of the lithium storage layer with electrolyte which may help preserve charge capacity and/or cycling stability.

In some embodiments, one or more lithium storage layers may break to form smaller lithium storage structures during lithiation or electrochemical formation or cycling, and the intermediate layer may assist in maintaining electrical continuity throughout the anode thereby preserving charge capacity and/or cycling stability. In some embodiments, when such breakage occurs, the intermediate layer may assist in stabilizing lithium storage layer material (e.g., silicon) by acting as a barrier to direct contact of the with electrolyte which may help preserve charge capacity and/or cycling stability.

In some embodiments, the intermediate layer may include a metal oxide that during cycling is at least partially reduced to metal which may assist in maintaining electrical continuity during cycling.

Other Anode Features

In some embodiments, the anode may further include one or more supplemental layers. provided over the outer surface of the lithium storage layer. In some embodiments, the supplemental layer is a protection layer to enhance lifetime or physical durability. The supplemental layer may be an oxide or nitride formed from the lithium storage material itself, e.g., silicon dioxide, silicon nitride, or silicon oxynitride in the case of silicon. A supplemental layer may be deposited, for example, by ALD, CVD, PECVD, evaporation, sputtering, solution coating, ink jet or any method that is compatible with the anode. In some embodiments, a supplemental layer is deposited in the same CVD or PECVD device as the lithium storage layer. For example, stoichiometric silicon dioxide or silicon nitride supplemental layer by be formed by introducing an oxygen- or nitrogen-containing gas (or both) along with the silicon precursor gas used to form the lithium storage layer. In some embodiments the supplemental layer may include boron nitride or silicon carbide. In some embodiments, a supplemental layer may include a metal compound as described below.

In some embodiments, the one or more supplemental layers may help stabilize the lithium storage layer by providing a barrier to direct electrochemical reactions with solvents or electrolytes that can degrade the interface. A supplemental layer should be reasonably conductive to lithium ions and permit lithium ions to move into and out of the lithium storage layer during charging and discharging. In some embodiments, the lithium ion conductivity of a supplemental layer is at least $10^{-9}$ S/cm, alternatively at least $10^{-8}$ S/cm, alternatively at least $10^{-7}$ S/cm, alternatively at least $10^{-6}$ S/cm. In some embodiments, the supplemental layer acts as a solid-state electrolyte. In some embodiments, the supplemental layer(s) are less electrically conductive than the lithium storage structure so that little or no electrochemical reduction of lithium ions to lithium metal occurs at the supplemental layer/electrolyte interface. In addition to providing protection from electrochemical reactions, a multiple supplemental layer structure embodiments may provide superior structural support. In some embodiments, although the supplemental layers may flex and may form fissures when the lithium storage layer expands during lithiation, crack propagation can be distributed between the layers to reduce direct exposure of the lithium storage structure to the bulk electrolyte. For example, a fissure in the second supplemental layer may not align with a fissure in the first supplemental layer. Such an advantage may not occur if just one thick supplemental layer is used. In an embodiment, the second supplemental layer may be formed of a material having higher flexibility than the first supplemental layer.

In some embodiments, a supplemental layer may include silicon nitride, e.g., substantially stoichiometric silicon nitride where the ratio of nitrogen to silicon is in a range of 1.33 to 1.25. A supplemental layer comprising silicon nitride may have an average thickness in a range of about 0.5 nm to 1 nm, alternatively 1 nm to 2 nm, alternatively 2 nm to 10 nm, alternatively 10 nm to 20 nm, alternatively 20 nm to 30 nm, alternatively 30 nm to 40 nm, alternatively 40 nm to 50 nm, or any combination of contiguous ranges thereof. Silicon nitride may be deposited by an atomic layer deposition (ALD) process or by a CVD process. In some embodiments, the lithium storage layer includes silicon deposited by some type of CVD process as described above, and at the end, a nitrogen gas source is added to the CVD deposition chamber along with the silicon source.

In some embodiments, a supplemental layer may include silicon dioxide, e.g., substantially stoichiometric silicon dioxide where the ratio of oxygen to silicon is in a range of 2.0 to 1.9. A supplemental layer comprising silicon dioxide may have an average thickness in a range of about 2 nm to 10 nm, alternatively 10 nm to 30 nm, alternatively 30 nm to 50 nm, alternatively 50 nm to 70 nm, alternatively 70 nm to 100 nm, alternatively 100 nm to 150 nm, alternatively 150 nm to 200 nm, or any combination of contiguous ranges thereof. Silicon dioxide may be deposited by an atomic layer deposition (ALD) process or by a CVD process. In some embodiments, the lithium storage layer includes silicon deposited by some type of CVD process as described above, and at the end, an oxygen-containing gas source is added to the CVD deposition chamber along with the silicon source.

In some embodiments, a supplemental layer may include silicon oxynitride, e.g., a substantially stoichiometric oxynitride of silicon ($SiO_xN_y$) wherein the sum of 0.5x and 0.75y is in a range of 1.00 to 0.95. A supplemental layer comprising silicon nitride may have an average thickness in a range of about 0.5 nm to 1 nm, alternatively 1 nm to 2 nm, alternatively 2 nm to 10 nm, alternatively 10 nm to 20 nm, alternatively 20 nm to 30 nm, alternatively 30 nm to 40 nm, alternatively 40 nm to 50 nm, alternatively 50 nm to 70 nm, alternatively 70 nm to 100 nm, alternatively 100 nm to 150 nm, or any combination of contiguous ranges thereof. In some embodiments, silicon oxynitride may be provided by a CVD process, including but not limited to, a PECVD process. The oxygen and nitrogen may be provided uniformly within the lithium storage layer, or alternatively the oxygen or nitrogen content may be varied as a function of position (e.g., height) within the storage layer.

In some embodiments, silicon nitride, silicon dioxide, or silicon oxynitride may be deposited by an atomic layer deposition (ALD) process or by a CVD process. In some embodiments, the lithium storage layer includes silicon deposited by some type of CVD process as described above, and at the end, a nitrogen- and/or an oxygen-containing gas source is added to the CVD deposition chamber along with the silicon source.

In some embodiments a supplemental layer may include a metal compound. In some embodiments, the metal compound includes a metal oxide, metal nitride, or metal oxynitride, e.g., those containing aluminum, titanium, vanadium, zirconium, or tin, or mixtures thereof. In some embodiments, a supplemental layer including a metal oxide, metal nitride, or metal oxynitride, may have an average thickness of less than about 100 nm, for example, in a range of about 0.5 nm to about 1 nm, alternatively about 1 nm to about 2 nm, alternatively 2 nm to 10 nm, alternatively 10 nm to 20 nm, alternatively 20 nm to 30 nm, alternatively 30 nm to 40 nm, alternatively 40 nm to 50 nm, or any combination of contiguous ranges thereof. The metal oxide, metal nitride, or metal oxynitride may include other components or dopants such as transition metals, phosphorous or silicon.

In some embodiments, the metal compound may include a lithium-containing material such as lithium phosphorous oxynitride (LIPON), a lithium phosphate, a lithium aluminum oxide, or a lithium lanthanum titanate. In some embodiments, the thickness of supplemental layer including a lithium-containing material may be in a range of 0.5 nm to 200 nm, alternatively 1 nm to 10 nm, alternatively 10 nm to 20 nm, alternatively 20 nm to 30 nm, alternatively 30 nm to 40 nm, alternatively 40 nm to 50 nm, alternatively 50 nm to 100 nm, alternatively 100 to 200 nm, or any combination of contiguous ranges thereof.

In some embodiments the metal compound may be deposited by a process comprising ALD, thermal evaporation, sputtering, or e-beam evaporation. ALD is a thin-film deposition technique typically based on the sequential use of a gas phase chemical process. The majority of ALD reactions use at least two chemicals, typically referred to as precursors. These precursors react with the surface of a material one at a time in a sequential, self-limiting, manner. Through the repeated exposure to separate precursors, a thin film is deposited, often in a conformal manner. In addition to conventional ALD systems, so-called spatial ALD (SALD) methods and materials can be used, e.g., as described U.S. Pat. No. 7,413,982, the entire contents of which are incorporated by reference herein for all purposes. In certain embodiments, SALD can be performed under ambient conditions and pressures and have higher throughput than conventional ALD systems.

In some embodiments, the process for depositing the metal compound may include electroless deposition, contact with a solution, contact with a reactive gas, or electrochemical methods. In some embodiments, a metal compound may be formed by depositing a metallic layer (including but not limited to thermal evaporation, CVD, sputtering, e-beam evaporation, electrochemical deposition, or electroless deposition) followed by treatment to convert the metal to the metal compound (including but not limited to, contact with a reactive solution, contact with an oxidizing agent, contact with a reactive gas, or a thermal treatment).

The supplemental layer may include an inorganic-organic hybrid structure having alternating layers of metal oxide and bridging organic materials. These inorganic-organic hybrid structures are sometimes referred to as "metalcone". Such structures can be made using a combination of atomic layer deposition to apply the metal compound and molecular layer deposition (MLD) to apply the organic. The organic bridge is typically a molecule having multiple functional groups. One group can react with a layer comprising a metal compound and the other group is available to react in a subsequent ALD step to bind a new metal. There is a wide range of reactive organic functional groups that can be used including, but not limited to hydroxy, carboxylic acid, amines, acid chlorides and anhydrides. Almost any metal compound suitable for ALD deposition can be used. Some non-limiting examples include ALD compounds for aluminum (e.g., trimethyl aluminum), titanium (e.g., titanium tetrachloride), zinc (e.g., diethyl zinc), and zirconium (tris (dimethylamino)cyclopentadienyl zirconium). For the purposes of the present disclosure, this alternating sublayer structure of metal oxide/bridging organic is considered a single supplemental layer of metalcone. When the metal compound includes aluminum, such structures may be referred to as an alucone. Similarly, when the metal compound includes zirconium, such structures may be referred to as a zircone. Further examples of inorganic-organic hybrid structures that may be suitable as a supplemental layer may be found in U.S. Pat. No. 9,376,455, and US patent publications 2019/0044151 and 2015/0072119, the entire contents of which are incorporated herein by reference.

In some embodiments, a supplemental layer having a metalcone may have a thickness in a range of 0.5 nm to 200 nm, alternatively 1 nm to 10 nm, alternatively 10 nm to 20 nm, alternatively 20 nm to 30 nm, alternatively 30 nm to 40 nm, alternatively 40 nm to 50 nm, alternatively 50 nm to 100 nm, alternatively 100 to 200 nm, or any combination of contiguous ranges thereof.

In some embodiments a supplemental layer (a first, a second, or an additional supplemental layer) may include boron nitride or silicon carbide and may have an average thickness of less than about 100 nm, for example, in a range of about 0.5 nm to about 1 nm, alternatively about 1 nm to about 2 nm, alternatively 2 nm to 10 nm, alternatively 10 nm to 20 nm, alternatively 20 nm to 30 nm, alternatively 30 nm to 40 nm, alternatively 40 nm to 50 nm, or any combination of contiguous ranges thereof.

In some embodiments the anode is at least partially pre-lithiated, i.e., the lithium storage layer and/or a metal oxide material includes some lithium prior to battery assembly, that is, prior to combining the anode with a cathode in a battery cell. Note that "lithiated storage layer" simply means that at least some of the potential storage capacity of the lithium storage layer is filled, but not necessarily all. In some embodiments, the lithiated storage layer may include lithium in a range of 1% to 10% of the theoretical lithium storage capacity of the lithium storage layer, alternatively 10% to 20%, alternatively, 20% to 30%, alternatively 30% to 40%, alternatively 40% to 50%, alternatively 50% to 60%, alternatively 60% to 70%, alternatively 70% to 80%, alternatively 80% to 90%, alternatively 90% to 100%, or any combination of contiguous ranges thereof. In some embodiments, the metal oxide material may capture some of the lithium, and one may need to account for such capture to achieve the desired lithium range in the lithiated storage layer.

In some embodiments prelithiation may include depositing lithium metal over the lithium storage layer, e.g., by evaporation, e-beam or sputtering. Alternatively, prelithiation may include contacting the anode with a reductive lithium organic compound, e.g., lithium naphthalene, n-butyllithium or the like. In some embodiments, prelithiation may include incorporating lithium by electrochemical reduction of lithium ion in prelithiation solution.

In some embodiments, prelithiation includes physical contact of the lithium storage layer with a lithiation material. The lithiation material may include a reducing lithium compound, lithium metal or a stabilized lithium metal powder, any of which may optionally be provided as a coating on a lithium transfer substrate. The lithium transfer substrate may include a metal (e.g., as a foil), a polymer, a ceramic, or some combination of such materials, optionally in a multilayer format. In some embodiments, such lithiation material may be provided on at least one side of a current separator that faces the anode, i.e., the current separator also acts as a lithium transfer substrate. Stabilized lithium metal powders ("SLMP") typically have a phosphate, carbonate or other coating over the lithium metal particles, e.g. as described in U.S. Pat. Nos. 8,377,236, 6,911,280, 5,567,474, 5,776,369, and 5,976,403, the entire contents of which are incorporated herein by reference. In some embodiments SLMPs may require physical pressure to break the coating and allow incorporation of the lithium into the lithium storage layer. In some embodiments, other lithiation materials may be applied with pressure and/or heat to promote lithium transfer into the lithium storage layer, optionally through one or more supplemental layers. In some embodiments a pressure applied between an anode and a lithiation material may be at least 200 kPa, alternatively at least 1000 kPa, alternatively at least 5000 kPa. Pressure may be applied, for example, by calendering, pressurized plates, or in the case of a lithiation material coating on a current separator, by assembly into battery having confinement or other pressurizing features.

In some embodiments, prelithiation includes thermally treating the lithium storage layer during lithium incorporation, after lithium incorporation, or both during and after. The thermal treatment may assist in the incorporation of the lithium into the lithium storage layer, for example by promoting lithium diffusion. In some embodiments, thermally treating includes exposing the anode to a temperature in a range of 50° C. to 100° C., alternatively 100° C. to 150° C., alternatively 150° C. to 200° C., alternatively 200° C. to 250° C., alternatively 250° C. to 300° C., or alternatively 300° C. to 350° C. In some embodiments, thermal treatment may be done under controlled atmosphere, e.g., under vacuum or argon atmosphere to avoid unwanted reactions with oxygen, nitrogen, water or other reactive gases.

In some embodiments, prelithiation may soften the lithium storage layer, for example, due to the formation of a lithium-silicon alloy. This softening may cause problems in some processes, for example, roll-to-roll processes whereby the softened lithium storage layer begins to stick to rollers or to itself during winding. In some embodiments providing at one or more supplemental layers prior to prelithiation or after prelithiation, the structural integrity and processability of the anode may be substantially improved. In some embodiments, the supplemental layer(s) may act as a harder interface with other surfaces to prevent or reduce contact of such surfaces with the softened lithium storage material.

In some embodiments, lithium metal may be deposited over the lithium storage layer followed by deposition of lithium ion-conducting layer. The anode may be thermally treated prior to deposition of the lithium ion-conducting layer, after deposition of the lithium ion-conducting layer, or both. In some embodiments, the lithium metal is deposited directly onto the lithium storage layer. In some embodiments, a supplemental layer, e.g., silicon nitride, is deposited onto the lithium storage layer prior to deposition of the lithium metal. In some embodiments, the lithium ion-conducting layer may include a lithium-containing material, a metal oxide, or a metalcone. Some non-limiting examples of lithium ion-conducting layer materials include a lithium phosphorous oxynitride (LIPON), a lithium phosphate, a lithium aluminum oxide, a lithium lanthanum titanate, and alucones. The lithium ion-conducting layer may include multiple sublayers of different materials, e.g., selected from the above list.

In some embodiments, the anode may be treated with a reducing agent prior to final battery assembly. The reducing agent may have an electrochemical potential sufficient to reduce at least a portion of the metal oxide layer. The reducing agent may include an inorganic hydride, a substituted or unsubstituted borohydride, an amine-borane, or an anionic organic aromatic compound. In some embodiments, the reducing agent may be provided in a non-aqueous solvent that is itself not reduced by the reducing agent and applied under controlled conditions having low oxygen and moisture.

Battery Features

The preceding description relates primarily to the anode (negative electrode) of a lithium-ion battery (LIB). The LIB typically includes a cathode (positive electrode), an electrolyte and a separator (if not using a solid-state electrolyte). As is well known, batteries can be formed into multilayer stacks of anodes and cathodes with an intervening separator. Alternatively, a single anode/cathode stack can be formed into a so-called jellyroll. Such structures are provided into an appropriate housing having desired electrical contacts.

In some embodiments, the battery may be constructed with confinement features to limit expansion of the battery, e.g., as described in US published applications 2018/0145367 and 2018/0166735, the entire contents of which are incorporated herein by reference for all purposes. In some embodiments a physical pressure is applied between the anode and cathode, e.g., using a tensioned spring or clip, a compressible film or the like. Confinement, pressure, or both confinement and pressure may help ensure that the anode remains in active contact with the current collector during formation and cycling, which may cause expansion and contraction of the lithium storage layer. In some embodiments, a jelly-roll battery design using metallic or other hard cylindrical housings may provide effective confinement, pressure, or both confinement and pressure.

Figure 10:
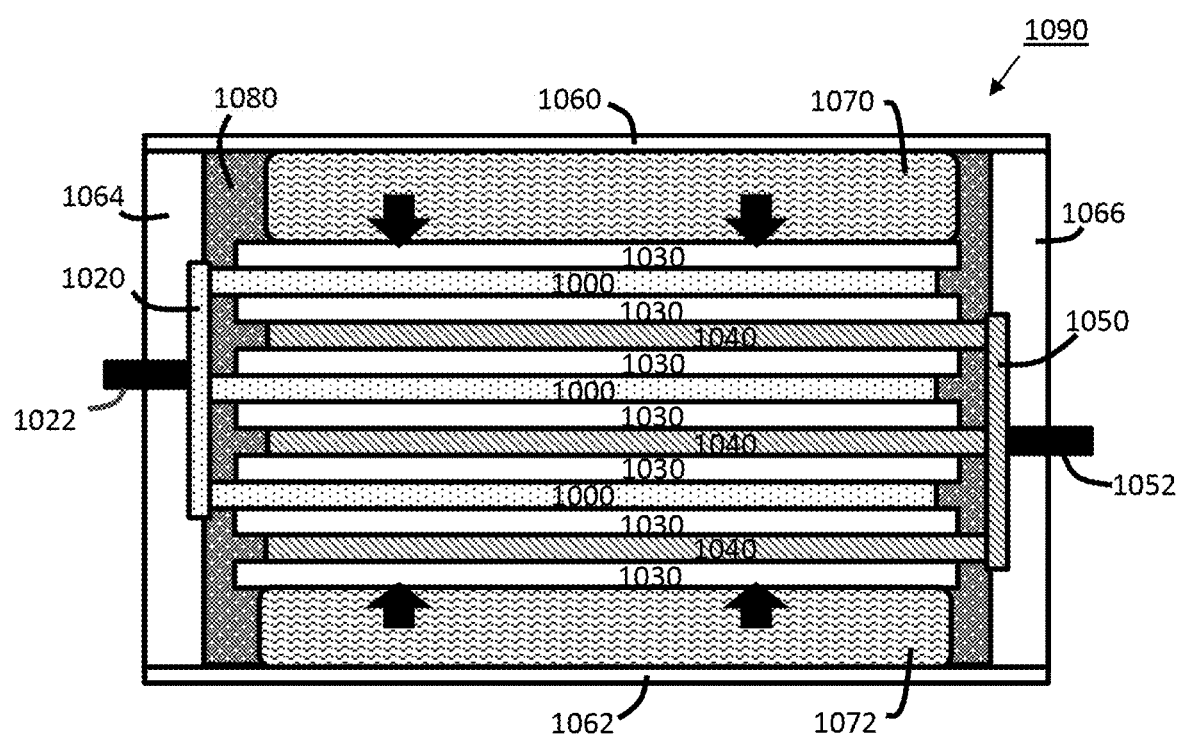
FIG. 10 is a cross-sectional view of a battery according to some embodiments of the present disclosure.

FIG. 10 is a schematic cross-sectional view of a battery according to some embodiments of the present disclosure. Battery 1090 includes top plate 1060, bottom plate 1062, anode side plate 1064, and cathode side plate 1066, which form part of a housing for the stack of anodes 1000, cathodes 1040, and intervening separators 1030. Anodes 1000 may include any anode described herein. Anodes are attached to an anode bus 1020 which is connected to anode lead 1022 that extends through anode side plate 1064. Cathodes are attached to a cathode bus 1050 which is connected to cathode lead 1052 that extends through cathode side plate 1066. Battery 1090 further includes electrolyte 1080 which fills the space and saturates the separators 1030. Top compression member 1070 and lower compression member 1072 apply physical pressure (arrows) between the anodes and cathodes. Compression members may be compressible films, e.g., made from a porous polymer or silicone. Alternatively, compression members may include an array of compressible features, e.g., made from porous polymer or silicone. Alternatively, the compression members may include springs or an array of springs. Alternatively, compression members may correspond to two sides of a compression clip or clamp. In some embodiments, the separator may act as a compressible film. In some embodiments the top and bottom plates may be formed a material and/or structured to resist deformation thereby confining battery swell.

Cathode

Positive electrode (cathode) materials include, but are not limited to, lithium metal oxides or compounds (e.g., $LiCoO_2$, $LiFePO_4$, $LiMnO_2$, $LiNiO_2$, $LiMn_2O_4$, $LiCoPO_4$, $LiNi_xCo_yMn_zO_2$, $LiNi_xCo_yAl_zO_2$, $LiFe_2(SO_4)_3$, or $Li_2FeSiO_4$), carbon fluoride, metal fluorides such as iron fluoride ($FeF_3$), metal oxide, sulfur, selenium, sulfur-selenium and combinations thereof. Cathode active materials are typically provided on, or in electrical communication with, an electrically conductive cathode current collector.

In some embodiments, a prelithiated anode of the present disclosure is used with cathode including sulfur, selenium, or both sulfur and selenium (collectively referred to herein as "chalcogen cathodes"). In some embodiments, a prelithiated anode of the present disclosure may be paired with a chalcogen cathode having an active material layer, wherein the active material layer may include a carbon material and a compound selected from the group consisting of Se, $Se_yS_x$, $Te_yS_x$, $Te_zSe_yS_x$, and combinations thereof, where x, y and z are any value between 0 and 1, the sum of y and x being 1, and the sum of z, y and x being 1, the compound impregnated in the carbon material, e.g., as described in US published application 2019/0097275, which is incorporated by reference herein for all purposes. The compound may be present in an amount of 9-90% by weight based on the total weight of the active material layer. In some embodiments, the chalcogen cathode active material layer further includes conductive carbon nanotubes to improve overall conductivity and physical durability and may permit faster charging and discharging. The presence of carbon nanotubes may further allow thicker coatings that have greater flexibility thereby allowing higher capacity.

Chalcogen cathodes are generally paired with lithium metal anodes. However, lithium metal anodes are difficult to handle, prone to degradation, and may further allow formation of dangerous dendritic lithium that can lead to catastrophic shorts. In some embodiments, prelithiated anodes of the present disclosure can achieve equivalent energy storage capacity of a pure lithium anode, but are much easier to handle and less prone to form dendritic lithium, thus making them more compatible with chalcogen cathodes.

Current Separator

The current separator allows ions to flow between the anode and cathode but prevents direct electrical contact. Such separators are typically porous sheets. Non-aqueous lithium-ion separators are single layer or multilayer polymer sheets, typically made of polyolefins, especially for small batteries. Most commonly, these are based on polyethylene or polypropylene, but polyethylene terephthalate (PET) and polyvinylidene fluoride (PVDF) can also be used. For example, a separator can have >30% porosity, low ionic resistivity, a thickness of ~10 to 50 μm and high bulk puncture strengths. Separators may alternatively include glass materials, ceramic materials, a ceramic material embedded in a polymer, a polymer coated with a ceramic, or some other composite or multilayer structure, e.g., to provide higher mechanical and thermal stability. As mentioned, the separator may include a lithiation material such as lithium metal, a reducing lithium compound, or an SLMP material coated at least on the side facing the anode.

Electrolyte

The electrolyte in lithium ion cells may be a liquid, a solid, or a gel. A typical liquid electrolyte comprises one or more solvents and one or more salts, at least one of which includes lithium. During the first few charge cycles (sometimes referred to as formation cycles), the organic solvent and/or the electrolyte may partially decompose on the negative electrode surface to form an SEI (Solid-Electrolyte-Interphase) layer. The SEI is generally electrically insulating but ionically conductive, thereby allowing lithium ions to pass through. The SEI may lessen decomposition of the electrolyte in the later charging cycles.

Some non-limiting examples of non-aqueous solvents suitable for some lithium ion cells include the following: cyclic carbonates (e.g., ethylene carbonate (EC), fluoroethylene carbonate (FEC), propylene carbonate (PC), butylene carbonate (BC) and vinylethylene carbonate (VEC)), vinylene carbonate (VC), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC, also commonly abbreviated EMC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitriles (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), organic compounds containing an S=O group (e.g., dimethyl sulfone and divinyl sulfone), and combinations thereof.

Non-aqueous liquid solvents can be employed in combination. Examples of these combinations include combinations of cyclic carbonate-linear carbonate, cyclic carbonate-lactone, cyclic carbonate-lactone-linear carbonate, cyclic carbonate-linear carbonate-lactone, cyclic carbonate-linear carbonate-ether, and cyclic carbonate-linear carbonate-linear ester. In some embodiments, a cyclic carbonate may be combined with a linear ester. Moreover, a cyclic carbonate may be combined with a lactone and a linear ester. In some embodiments, the weight ratio, or alternatively the volume ratio, of a cyclic carbonate to a linear ester is in a range of 1:9 to 10:1, alternatively 2:8 to 7:3

A salt for liquid electrolytes may include one or more of the following non-limiting examples: $LiPF_6$, $LiBF_4$, $LiClO_4$, $LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3$ (iso-$C_3F_7$)$_3$, $LiPF_5$(iso-$C_3F_7$), lithium salts having cyclic alkyl groups (e.g., $(CF_2)_2(SO_2)_{2x}Li$ and $(CF_2)_3(SO_2)_{2x}Li$), and combinations thereof. Common combinations include: $LiPF_6$ and $LiBF_4$; $LiPF_6$ and $LiN(CF_3SO_2)_2$; and $LiBF_4$ and $LiN(CF_3SO_2)_2$.

In some embodiments, the total concentration of salt in a liquid non-aqueous solvent (or combination of solvents) is at least 0.3 M, alternatively at least 0.7M. The upper concentration limit may be driven by a solubility limit and operational temperature range. In some embodiments, the concentration of salt is no greater than about 2.5 M, alternatively no more than about 1.5 M.

In some embodiments, the battery electrolyte includes a non-aqueous ionic liquid and a lithium salt.

A solid-state electrolyte may be used without the separator because it serves as the separator itself. It is electrically insulating, ionically conductive, and electrochemically stable. In the solid electrolyte configuration, a lithium containing salt, which could be the same as for the liquid electrolyte cells described above, is employed but rather than being dissolved in an organic solvent, it is held in a solid polymer composite. Examples of solid polymer electrolytes may be ionically conductive polymers prepared from monomers containing atoms having lone pairs of electrons available for the lithium ions of electrolyte salts to attach to and move between during conduction, such as polyvinylidene fluoride (PVDF) or chloride or copolymer of their derivatives, poly(chlorotrifluoroethylene), poly(ethylene-chlorotrifluoro-ethylene), or poly(fluorinated ethylene-propylene), polyethylene oxide (PEO) and oxymethylene linked PEO, PEO-PPO-PEO crosslinked with trifunctional urethane, poly(bis(methoxy-ethoxy-ethoxide))-phosphazene (MEEP), triol-type PEO crosslinked with difunctional urethane, poly((oligo)oxyethylene)methacrylate-co-alkali metal methacrylate, polyacrylonitrile (PAN), polymethylmethacrylate (PMMA), polymethylacrylonitrile (PMAN), polysiloxanes and their copolymers and derivatives, acrylate-based polymer, other similar solvent-free polymers, combinations of the foregoing polymers either condensed or cross-linked to form a different polymer, and physical mixtures of any of the foregoing polymers. Other less conductive polymers that may be used in combination with the above polymers to improve the strength of thin laminates include: polyester (PET), polypropylene (PP), polyethylene naphthalate (PEN), polyvinylidene fluoride (PVDF), polycarbonate (PC), polyphenylene sulfide (PPS), and polytetrafluoroethylene (PTFE). Such solid polymer electrolytes may further include a small amount of organic solvents listed above. The polymer electrolyte may be an ionic liquid polymer. Such polymer-based electrolytes can be coated using any number of conventional methods such as curtain coating, slot coating, spin coating, inkjet coating, spray coating or other suitable method.

Additives may be included in the electrolyte to serve various functions. For example, additives such as polymerizable compounds having an unsaturated double bond may be added to stabilize or modify the SEI. Certain amines or borate compounds can act as cathode protection agents. Lewis acids can be added to stabilize fluorine-containing anion such as $PF_6^-$. Safety protection agents include those to protect overcharge, e.g., anisoles, or act as fire retardants, e.g., alkyl phosphates.

In some embodiments, a solid-state electrolyte may be vapor deposited, solution-coated, melt-coated or a combination thereof. Whether vapor deposited or coated from a solution or melt, embodiments of the present disclosure are advantageous over nanostructured devices. In the case of vapor deposited solid-state electrolytes, anodes of the present disclosure do not have the problem of physical "shadowing" that nano- or micro-structured devices do. Shadowing will create non-uniform deposition of the electrolyte. The anodes disclosed here generally do not have high aspect ratio structures as described above, resulting in no or low shadowing effects. Vapor deposited solid electrolytes can be deposited uniformly and rapidly over anodes of the present disclosure without resorting to slow atomic layer or other conformal coating methods. In the case of solution or melt-deposited solid-state electrolytes, anodes of the present disclosure may be more robust to the stresses and shear forces caused by the coating operation. High aspect ratio nano- or micro-structures are susceptible to breakage from such forces.

In some embodiments, the original, non-cycled anode may undergo structural or chemical changes during electrochemical charging/discharging, for example, from normal battery usage or from an earlier "electrochemical formation step". As is known in the art, an electrochemical formation step is commonly used to form an initial SEI layer and involves relatively gentle conditions of low current and limited voltages. The modified anode prepared in part from such electrochemical charging/discharging cycles may still have excellent performance properties, despite such structural and/or chemical changes relative to the original, non-cycled anode.

Although the present anodes have been discussed with reference to batteries, in some embodiments the present anodes may be used in hybrid capacitor devices. Relative to conventional anodes, the anodes of the present disclosure may have one or more of at least the following unexpected advantages: comparable or improved stability at aggressive ≥1C charging rates; higher overall areal charge capacity; higher gravimetric charge capacity; higher volumetric charge capacity; improved physical durability; simplified manufacturing process; and/or a more reproducible manufacturing process.

Some non-limiting representative embodiments are listed below.

1. An anode for an energy storage device comprising:
a current collector comprising a metal oxide layer;
a first lithium storage layer overlaying the current collector;
a first intermediate layer overlaying at least a portion of the first lithium storage layer; and
a second lithium storage layer overlaying the first intermediate layer,
wherein the first lithium storage layer is a continuous porous lithium storage layer comprising a total content of silicon, germanium, or a combination thereof, of at least 40 atomic %.

2. The anode of embodiment 1, wherein the continuous porous lithium storage layer comprises at least 85 atomic % amorphous silicon, and the continuous porous lithium storage layer has a density in a range of 1.1 g/cm$^3$ to 2.2 g/cm$^3$.

3. The anode of embodiment 1 or 2, wherein the continuous porous lithium storage layer is a first continuous porous lithium storage layer, the second lithium storage layer is a second continuous porous lithium storage layer comprising a total content of silicon, germanium, or a combination thereof, of at least 40 atomic %.

4. The anode of embodiment 1 or 2, wherein the continuous porous lithium storage layer is a first continuous porous lithium storage layer, the second lithium storage layer is a second continuous porous lithium storage layer comprising at least 85 atomic % amorphous silicon, and the second continuous porous lithium storage layer has a density in a range of 1.1 g/cm$^3$ to 2.2 g/cm$^3$.

5. The anode according to any of embodiments 1-4, further comprising:
a second intermediate layer overlaying at least a portion of the second lithium storage layer; and
a third lithium storage layer overlaying the second intermediate layer.

6. The anode of embodiment 5, wherein the third lithium storage layer is a third continuous porous lithium storage layer comprising a total content of silicon, germanium, or a combination thereof, of at least 40 atomic %.

7. The anode of embodiment 5 or 6, wherein the third lithium storage layer is a third continuous porous lithium storage layer comprising at least 85 atomic % amorphous silicon, and the third continuous porous lithium storage layer has a density in a range of 1.1 g/cm$^3$ to 2.2 g/cm$^3$.

8. The anode according to any of embodiments 1-7, wherein at least one intermediate layer comprises an electrically conductive or semiconductive material.

9. The anode according to any of embodiments 1-8, wherein at least one intermediate layer comprises an electrically conductive material.

10. The anode according to any of embodiments 1-9, wherein at least one intermediate layer comprises a carbon material.

11. The anode of embodiment 10, wherein the carbon material comprises diamond, carbon black, graphite, graphene, graphene oxide, reduced graphene oxide, carbon nanotubes, or fullerene.

12. The anode according to any of embodiments 1-11, wherein at least one intermediate layer comprises a metal.

13. The anode of embodiment 9 wherein the metal is a transition metal.

14. The anode according to any of embodiments 1-13, wherein at least one intermediate layer comprises a metal oxide, a metal nitride, a metal oxynitride, a metal sulfide, or a metal oxysulfide.

15. The anode according to embodiment 14 wherein the metal oxide, the metal nitride, the metal oxynitride, the metal sulfide, or the metal oxysulfide comprises a transition metal.

16. The anode according to any of embodiments 1-15, wherein at least one intermediate layer comprises silicon nitride.

17. The anode according to any of embodiments 1-13, wherein at least one intermediate layer comprises a first sublayer in contact with an underlying lithium storage layer and a second sublayer overlaying the first sublayer and in contact with an overlying lithium storage layer, the first sublayer having different a chemical composition than the second sublayer.

18. The anode of embodiment 17, wherein the first sublayer comprises an electrically conductive metal and the second sublayer comprises a metal oxide and overlays the first sublayer.

19 The anode according to any of embodiments 1-18, wherein each intermediate layer has a lower reversible lithium storage capacity in units of mAh/g than any of the lithium storage layers.

20. The anode according to any of embodiments 1-19, wherein at least one intermediate layer is patterned to include one or more open areas and one or more patterned portions, wherein two lithium storage layers are separated by the one or more patterned portions of the intermediate layer and in contact with each other in the one or more open areas.

21. The anode according to any of embodiments 1-20, wherein the lithium storage layers are substantially free of nanostructures.

22. The anode according to any of embodiments 1-21, wherein each intermediate layer has a thickness in a range of about 1 nm to about 100 nm.

23. The anode according to any of embodiments 1-22, wherein the metal oxide layer comprises an oxide of a transition metal.

24. The anode according to any of embodiments 1-23, wherein the metal oxide layer comprises an oxide of nickel, an oxide of copper, or an oxide of titanium.

25. The anode according to any of embodiments 1-24, wherein the metal oxide layer has an average thickness of at least 0.01 μm.

26. The anode according to any of embodiments 1-24, wherein the metal oxide layer has an average thickness in a range of about 0.02 μm to about 2.0 μm.

27. The anode according to any of embodiments 1-26, wherein the current collector further comprises an electrically conductive layer, and wherein the metal oxide layer is interposed between the electrically conductive layer and the first lithium storage layer.

28. The anode according to embodiment 27, wherein the electrically conductive layer comprises stainless steel, titanium, nickel, copper, or a conductive carbon.

29. The anode according to any of embodiments 1-28, wherein at least one lithium storage layer has an average thickness of at least 3 μm.

30. The anode according to any of embodiments 1-29, wherein the combined thickness of all lithium storage layers and all intermediate layers is in a range of about 5 μm to 30 μm.

31. A lithium-ion battery comprising the anode according to any of embodiments 1-30 and a cathode.

32. The lithium-ion battery of embodiment 31 wherein the anode is prelithiated and the cathode comprises sulfur, selenium, or both sulfur and selenium.

33. The lithium-ion battery of embodiment 32, wherein the cathode further comprises a first carbon material.

34. The lithium-ion battery of embodiment 33, wherein the cathode further comprises carbon nanotubes.

35. A method of making an anode for use in an energy storage device, the method comprising:
depositing a first lithium storage layer over a current collector by a first CVD process, wherein the current collector comprises a metal oxide layer and the first lithium storage layer is deposited onto the metal oxide layer;
forming a first intermediate layer over at least a portion of the first lithium storage layer; and
depositing a second lithium storage layer over the first intermediate layer by a second CVD process,
wherein at least the first lithium storage layer is a continuous porous lithium storage layer comprising a total content of silicon, germanium, or a combination thereof, of at least 40 atomic %.

36. The method of embodiment 35, wherein the continuous porous lithium storage layer comprises at least 85 atomic % amorphous silicon, and the continuous porous lithium storage layer has a density in a range of 1.1 g/cm$^3$ to 2.2 g/cm$^3$.

37. The method of embodiment 35 or 36, wherein the continuous porous lithium storage layer is a first continuous porous lithium storage layer, the second lithium storage layer is a second continuous porous lithium storage layer comprising a total content of silicon, germanium, or a combination thereof, of at least 40 atomic %.

38. The method of embodiment 35 or 36, wherein the continuous porous lithium storage layer is a first continuous porous lithium storage layer, the second lithium storage layer is a second continuous porous lithium storage layer comprising at least 85 atomic % amorphous silicon, and the second continuous porous lithium storage layer has a density in a range of 1.1 g/cm$^3$ to 2.2 g/cm$^3$.

39. The method according to any of embodiments 35-38, wherein one or both of the first CVD process and the second CVD process comprise PECVD.

40. The method according to any of embodiments 35-39, wherein one or both of the first lithium storage layer and the second lithium storage layer have an average thickness of at least 3 μm.

41. The method according to any of embodiments 35-40, wherein forming the first intermediate layer comprises depositing an electrically conductive metal onto the first lithium storage layer.

42. The method of embodiment 41, wherein the electrically conductive metal comprises is a transition metal.

43. The method of embodiment 42, wherein the transition metal is nickel, titanium, copper, or zinc.

44. The method according to any of embodiments 41-43, further comprising oxidizing at least a portion of the metal to form a first intermediate layer comprising a metal oxide.

45. The method according to any of embodiments 41-44, wherein the metal is deposited by vapor deposition, sputtering, or a CVD process.

46. The method according to any of embodiments 35-40, wherein forming the first intermediate layer comprises depositing a metal oxide, a metal nitride, a metal oxynitride, a metal sulfide, or a metal oxysulfide.

47. The method according to embodiment 46, wherein the metal oxide, the metal nitride, the metal oxynitride, the metal sulfide, or the metal oxysulfide comprises a transition metal.

48. The method of embodiment 46 or 47, wherein the deposition of the metal oxide, the metal nitride, the metal oxynitride, the metal sulfide, or the metal oxysulfide comprises vapor deposition, sputtering, atomic layer deposition, or a CVD process.

49. The method according to any of embodiments 35-44, 46, or 47, wherein forming the first intermediate layer comprises depositing a solution or dispersion comprising an intermediate layer material or precursor over the first lithium storage layer.

50. The method according to any of embodiments 35-49, wherein forming at least one intermediate layer comprises a patterning process.

51. The method of embodiment 50, wherein the patterning process comprises patterned printing, photolithography, or vapor deposition through a shadow mask.

52. The method according to any of embodiments 35-51, further comprising thermally treating the anode after deposition of the second lithium storage layer is complete and prior to battery assembly, wherein the thermally treating includes heating the anode to a temperature in a range of 100° C. to 600° C. for a time period in a range of 0.1 min to 120 min.

53. The method of embodiment 52, wherein the thermally treating is conducted in an environment having a partial pressure of oxygen and water each less than 1 Torr, and wherein the temperature is in a range of 350° C. to 600° C.

54. A lithium-ion battery comprising a cathode and an anode, wherein the anode is made by a method according to any of embodiments 35-53.

55. The lithium-ion battery of embodiment 54 wherein the cathode comprises sulfur, selenium, or both sulfur and selenium, and the anode is at least partially prelithiated to form a lithiated storage layer.

The above description of example embodiments of the invention has been presented for the purposes of illustration and description. It is not intended to be exhaustive or to limit the invention to the precise form described, and many modifications and variations are possible in light of the teaching above.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific embodiment may not always be present in variations of that embodiment or may be added to other embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the layer" includes reference to one or more layers and equivalents thereof known to those skilled in the art, and so forth. The invention has now been described in detail for the purposes of clarity and understanding. However, it will be appreciated that certain changes and modifications may be practiced within the scope of the appended claims.

All publications, patents, and patent applications cited herein are hereby incorporated by reference in their entirety for all purposes. None is admitted to be prior art.

We claim:

1. An anode for an energy storage device comprising:
   a current collector comprising a metal oxide layer;
   a first lithium storage layer overlaying the current collector;
   a first intermediate layer overlaying at least a portion of the first lithium storage layer; and
   a second lithium storage layer overlaying the first intermediate layer,
   wherein the first lithium storage layer is a continuous porous lithium storage layer comprising a total content of silicon, germanium, or a combination thereof, of at least 40 atomic %.

2. The anode of claim 1, wherein the continuous porous lithium storage layer comprises at least 85 atomic % amorphous silicon, and the continuous porous lithium storage layer has a density in a range of 1.1 $g/cm^3$ to 2.2 $g/cm^3$.

3. The anode of claim 1, wherein the continuous porous lithium storage layer is a first continuous porous lithium storage layer, the second lithium storage layer is a second continuous porous lithium storage layer comprising at least 85 atomic % amorphous silicon, and the second continuous porous lithium storage layer has a density in a range of 1.1 $g/cm^3$ to 2.2 $g/cm^3$.

4. The anode of claim 1, further comprising:
   a second intermediate layer overlaying at least a portion of the second lithium storage layer; and
   a third lithium storage layer overlaying the second intermediate layer.

5. The anode of claim 1, wherein the first intermediate layer comprises an electrically conductive or semiconductive material.

6. The anode of claim 1, wherein the first intermediate layer comprises a carbon material.

7. The anode of claim 1, wherein the first intermediate layer comprises a metal.

8. The anode of claim 7, wherein the metal is a transition metal.

9. The anode of claim 1, wherein the first intermediate layer comprises a metal oxide, a metal nitride, a metal oxynitride, a metal sulfide, or a metal oxysulfide.

10. The anode of claim 1, wherein the first intermediate layer is patterned to include one or more open areas and one or more patterned portions, wherein the first and second lithium storage layers are separated by the one or more patterned portions of the first intermediate layer and in contact with each other in the one or more open areas.

11. The anode of claim 1, wherein the first intermediate layer has a thickness in a range of about 1 nm to about 100 nm.

12. The anode of claim 1, wherein the metal oxide layer comprises an oxide of a transition metal.

13. The anode of claim 1, wherein the metal oxide layer comprises an oxide of nickel or an oxide of titanium.

14. The anode of claim 1, wherein the metal oxide layer has an average thickness in a range of about 0.02 μm to about 2.0 μm.

15. The anode of claim 1, wherein the current collector further comprises an electrically conductive layer, and wherein the metal oxide layer is interposed between the electrically conductive layer and the first lithium storage layer.

16. The anode of claim 1, wherein the first lithium storage layer or the second lithium storage layer has an average thickness of at least 3 μm.

17. The anode of claim 1, wherein the combined thickness of the first and second lithium storage layers and the first intermediate layer is in a range of 5 μm to 30 μm.

18. A lithium-ion battery comprising the anode of claim 1 and a cathode.

19. The lithium-ion battery of claim 18 wherein the anode is prelithiated and the cathode comprises sulfur, selenium, or both sulfur and selenium.

* * * * *